US006308396B1

(12) United States Patent
Lewis et al.

(10) Patent No.: US 6,308,396 B1
(45) Date of Patent: Oct. 30, 2001

(54) AUTOMATED BANKING MACHINE ENCLOSURE MANUFACTURING METHOD

(75) Inventors: Kim R. Lewis, Stow; Richard C. Lute, Mogadore; Jeffrey A. Hill, Canton; Howard E. Antram, Alliance, all of OH (US)

(73) Assignee: Diebold, Incorporated, North Canton, OH (US)

(*) Notice: Subject to any disclaimer, the term of this patent is extended or adjusted under 35 U.S.C. 154(b) by 0 days.

(21) Appl. No.: 09/254,518

(22) PCT Filed: Nov. 25, 1997

(86) PCT No.: PCT/US97/22512

§ 371 Date: Nov. 25, 1997

§ 102(e) Date: Nov. 25, 1997

(87) PCT Pub. No.: WO98/23414

PCT Pub. Date: Jun. 4, 1998

Related U.S. Application Data

(60) Provisional application No. 60/031,887, filed on Nov. 27, 1996.

(51) Int. Cl.[7] .......................................... B23Q 3/00

(52) U.S. Cl. ................................ 29/467; 29/464; 29/521

(58) Field of Search ............................ 29/462, 464, 467, 29/513, 521; 228/184, 212; 109/58, 59 R, 73, 74, 78, 79, 75, 76, 77, 80

(56) References Cited

U.S. PATENT DOCUMENTS

| | | | | |
|---|---|---|---|---|
| 3,564,112 | * | 2/1971 | Algotsson | 220/3.92 |
| 3,696,960 | * | 10/1972 | Smirle | 220/23.4 |
| 4,944,082 | * | 7/1990 | Jones et al. | 29/467 |
| 5,386,788 | * | 2/1995 | Linker et al. | 109/58 |
| 5,784,973 | * | 7/1998 | Mercer et al. | 109/59 R |

* cited by examiner

*Primary Examiner*—David P. Bryant
*Assistant Examiner*—Jermie E. Cozart
(74) *Attorney, Agent, or Firm*—Ralph E. Jocke; Walker & Jocke

(57) ABSTRACT

A secure enclosure (10) for an automated banking machine includes a chest portion (12) and a moveable door (14). The door is supported on hinge assemblies (20, 22) which enable mounting and accurately positioning the door despite misalignment of the hinges. The chest portion is manufactured from panels (28, 36, 38, 66, 76) which include interengaging projections and recesses. The projections and recesses ensure that the proper panels are used in the assembly of the particular type secure enclosure, as well as that the panels which make up the enclosure are properly oriented.

19 Claims, 15 Drawing Sheets

AUTOMATED BANKING MACHINE ENCLOSURE MANUFACTURING METHOD

This application nclaims benefit of Provisional application Serial No. 60/031,887 filed Nov. 27, 1996.

TECHNICAL FIELD

This invention relates to automated banking machines. Specifically this invention relates to a method of making a secure enclosure for an automated banking machine, which enclosure is more readily manufactured and which provides enhanced security.

BACKGROUND ART

Automated banking machines are known in the prior art. Popular automated banking machines often used by consumers are automated teller machines (ATMs). ATMs are increasingly used by consumers to conduct banking transactions. Common banking transactions conducted by consumers at ATMs include deposits, withdrawals, account transfers and balance inquiries.

Most ATMs include a secure enclosure. The secure enclosure is used to hold currency and other valuable items inside the machine. Deposits made by customers into an ATM are also preferably held within a secure enclosure until they can be removed by authorized personnel. The secure enclosure also preferably houses portions of the mechanisms used for receiving deposits and dispensing currency. The secure enclosure also preferably houses electronic components of the ATM which may be subject to attack by someone attempting to compromise the security of the ATM or the electronic communications network in which it is operated.

Secure enclosures used in automated banking machines are specifically made for the type of machine in which they are used. Such enclosures, unlike most common types of safes or vaults, include multiple openings through the walls of the enclosure. These openings are precisely positioned. Such precise positioning is necessary to cooperate with the components of the ATM outside the enclosure. For example, to enable a currency dispenser mechanism within the secure enclosure to pass currency notes to the mechanism outside the enclosure that delivers them to the customer requires an opening through the secure enclosure. Likewise a precise opening is required to pass deposit envelopes and other valuables from the deposit accepting opening and mechanism outside of the secure enclosure to the depository mechanism inside the secure enclosure. Similarly, wiring harnesses and other connectors for the electronic and alarm components within the enclosure extend through openings which must be accurately positioned to enable connection to other wiring or devices in the ATM that are outside the enclosure.

There are many types of ATMs. ATMs can be configured as lobby units, which are made to be used within the confines of a building. Other ATMs are made for "through the wall" installation which enables a user outside of a building to use the machine. ATMs vary in physical size due to a number of factors. ATMs that provide a wide variety of functions, such as passbook printing, ticket or stamp dispensing, check cashing and other functions must necessarily be physically larger than machines that do not provide such functions. Such multi-function machines generally have secure enclosures that are much larger than machines that have less capabilities. ATMs that provide a single function, such as dispensing cash, often require a much smaller secure enclosure.

The manufacture of various types of ATMs often necessitates that manufacturers of ATMs produce a number of types of secure enclosures. These enclosures may vary not only in physical size and configuration, but also in terms of position and variety of openings that are provided through the walls of the secure enclosure. Problems in production processes may arise when enclosures are assembled from panels of similar size. If care is not exercised an incorrect panel may be assembled into the enclosure. Likewise an enclosure may inadvertently be made with two panels of the same type, such as two tops or two bottoms. Panels may also be reversed from the proper position. The potential for confusion increases when several enclosures of similar size are being manufactured from similar panels, which enclosures have different openings to accommodate the positions of devices in the ATM in which the enclosure is used. The improper manufacture of an enclosure generally results in a significant amount of scrap material, as well as wasted fabrication labor.

Thus there exists a need for a secure enclosure and a method of manufacturing a secure enclosure for an automated banking machine that is more reliable and economical.

Secure enclosures in automated banking machines generally include a moveable door which enables authorized personnel to gain access to the mechanisms, electronic equipment and valuables stored within the secure enclosure. A sensing mechanism used in connection with such a door must be strong and highly resistant to attack by burglars. At the same time the securing mechanism must be readily opened by authorized personnel, who must be able to move quickly to perform servicing activities inside the secure enclosure.

The manufacture of a secure enclosure for an automated banking machine has traditionally required that a great deal of attention be paid to the hinges which are used to attach the moveable door to the secure enclosure. Hinges are often a site for attack by burglars. To achieve strong hinges, care has been exercised to assure that the hinges are securely attached to both the door and enclosure. Because the hinges are often two or more separate assemblies and must be permanently fixed in place, often by welding, it is common to connect the hinge assemblies first to either the door or enclosure, and then to the other component. This avoids misalignment but can be burdensome from an assembly standpoint.

When components of the hinge assemblies are attached to the door and enclosure in separate operations it is not uncommon to encounter situations where the hinges are slightly misaligned. In such circumstances it may not be possible to mount the door on the enclosure without considerable rework. Even if the door can be mounted on the hinges it may not be properly positioned to enable closing the opening of the enclosure. Again, in such circumstances costly rework is required to make the secure enclosure suitable for use in an automated teller machine.

Thus there exists a need for a system and method of mounting a door on a secure enclosure of an automated banking machine that can be more readily done. There further exists a need for a system and method for mounting a door on a secure enclosure of an automated banking machine in which a hinge does not pose a weak point that is vulnerable to attack by burglars. There further exists a need for a system and method for mounting a door on a secure enclosure of an automated banking machine that can be done despite misalignment of hinges which support the door.

Secure enclosures for automated banking machines also include, in connection with the moveable door, a locking bolt work. The locking bolt work is generally in a secure, locking condition when the door is closed. When authorized personnel act to open the door of the secure enclosure, such as by inputting a proper combination to a lock, the locking bolt work is moveable to a second unsecured condition. In the second condition of the bolt work the door is enabled to be opened so that components within the secure enclosure may be serviced.

Due to the incentive for burglars to attack ATMs, the bolt work and other locking mechanisms used in connection with the moveable doors of secure enclosures preferably provide a high degree of resistance to attack. However, providing enhanced security also often comes with a high degree of complexity. This increases the cost of the automated banking machine. Complex mechanisms can also make it more difficult for authorized personnel to gain access to the secure enclosure.

Thus there exists a need for a locking bolt work apparatus for a door of an automated banking machine that provides enhanced security, but which is also economical and can be quickly opened by authorized personnel.

DISCLOSURE OF INVENTION

It is an object of the present invention to provide a secure enclosure for an automated banking machine.

It is a further object of the present invention to provide a method of making a secure enclosure for an automated banking machine that is more readily accomplished.

It is a further object of the present invention to provide a method of making a secure enclosure for an automated banking machine that is more accurate and reliable.

It is a further object of the present invention to provide a method of making a secure enclosure for an automated banking machine that provides enhanced security.

It is a further object of the present invention to provide a secure enclosure for an automated banking machine with a more secure bolt work.

It is a further object of the present invention to provide a secure enclosure for an automated banking machine that includes a moveable door that is more readily mounted but, which when closed, provides enhanced security.

It is a further object of the present invention to provide a secure enclosure for an automated banking machine that includes a moveable door which is mounted to the enclosure through an adjustable hinge assembly.

It is a further object of the present invention to provide a secure enclosure for an automated banking machine that includes a moveable door mounted on multiple hinges that enable the door to be properly mounted and positioned despite misalignment of the hinges.

It is a further object of the present invention to provide a secure enclosure for an automated banking machine in which the hinges, which are used to mount the moveable door on the enclosure, are less vulnerable to attack.

It is a further object of the present invention to provide a system and method for manufacturing secure enclosures for automated banking machines that reduces the risk that components of the enclosure will be improperly assembled.

It is a further object of the present invention to provide a method for making a secure enclosure for an automated banking machine that includes a moveable door that may be more readily installed on the secure enclosure.

It is a further object of the present invention to provide a method for making a secure enclosure for an automated banking machine that includes a moveable door which is adjustably positionable on multiple hinge assemblies.

Further objects of the present invention will be made apparent in the following Best Modes for Carrying Out Invention and the appended claims.

The foregoing objects are accomplished in a preferred embodiment of the present invention by a secure enclosure for an automated banking machine. In the preferred form of the invention the automated banking machine is an ATM. Precisely positioned openings extend through the secure enclosure. The openings enable cooperation between devices and mechanisms inside and outside of the enclosure, which enables the conduct of banking transactions.

The secure enclosure is a generally rectangular enclosure that includes five panels and a moveable door. The enclosure includes a front panel. The front panel is connected to a hinge side panel and a parallel spaced striker side panel. The enclosure further includes a top panel and a parallel spaced bottom panel. An opening to the enclosure extends on a side opposite the front panel when the door is in an open position. Each of the panels preferably include precisely positioned access openings for cooperating with the components which make up the ATM.

In the preferred form of the invention the front, top and bottom panels each include accurately sized and positioned projections. In the case of the top and bottom panels, the projections extend on the three side edge surfaces of the panel which are not adjacent to the opening. The front panel includes projections that extend outward on the side edge surfaces adjacent to each of the side panels. Each of the side panels includes accurately positioned recesses in its edge surfaces which accept the projections on the top, bottom and front panels. The front panel also includes recesses that accept the projections on the top and bottom panels at the edge surfaces where the front panel is adjacent thereto.

The size and position of the projections and recesses on each of the panels are arranged so that only the proper panels which make up a particular secure enclosure can be assembled in a manner which will enable the projections and recesses to fit together in proper interengaging relation. In addition, the projections and recesses are positioned so that in assembling the panels into the secure enclosure, the panels may only be assembled in a way that causes the openings to be positioned in the proper locations required for the particular type of ATM.

The hinge side panel and the striker side panel further include a plurality of vertically aligned rectangular apertures therethrough. The hinge side panel also includes a pair of hinge mounting recesses in its front edge adjacent to the opening. A pair of chest hinges are mounted to the enclosure in the recesses. The door sized for closing the opening of the enclosure has mating door hinges mounted thereto. The hinge side of the door includes a plurality of dead bolt projections. The arc of rotation of the hinges enables the dead bolt projections on the door to engage the apertures on the hinge side panel in interfitting relation when the door is in the closed position. This provides for securely locking the door in the closed position and reduces the vulnerability of the hinges as points of attack.

The hinge assemblies used for connecting the door and the hinge side panel enable connection of the hinges together even when the hinges are misaligned. In addition the hinge assemblies enable independent vertical adjustment so that the door may be positioned to close the opening of the secure enclosure.

The door has mounted thereon a bolt work or locking bolt work mechanism. The locking bolt work mechanism is moveable responsive to the condition of a lock, between a secure and an open condition. The bolt work mechanism includes a moveable locking bolt with a plurality of locking bolt projections. In the secure condition of the locking bolt the locking bolt projections extend in the apertures in the striker side panel of the enclosure. In the open condition the locking bolt projections are retracted from the apertures enabling movement of the door to the open position.

The locking bolt is moveable in response to an actuating mechanism. The actuating mechanism includes a centrally positioned drive cam. The drive cam is in operative connection with the lock and is enabled to be moved by a handle when the lock is in an open condition. The drive cam is connected by two generally vertically extending long links to a pair of spaced idler cams. Each of the idler cams is rotatably moveable and is positioned adjacent to the vertical ends of the locking bolt. The locking bolt is connected to each of the idler cams by a pair of rotatable short links.

In the secure condition of the locking bolt, the drive cam and the idler cams are in adjacent abutting position with the locking bolt. In addition, the short links are positioned in an over center relation so that limited rotational movement of the cams does not retract the locking bolt from engagement with the apertures.

In response to unlocking the lock by authorized personnel, the drive cam of the actuating mechanism is enabled to be rotated. This causes rotation of the idler cams through the long links. The rotation of the idler cams causes the short links to move the locking bolt in an inward direction. The locking bolt is enabled to move sufficiently to disengage from the apertures in the striker side panel of the enclosure which enables opening of the door.

BEST MODES FOR CARRYING OUT INVENTION

Figure 1:
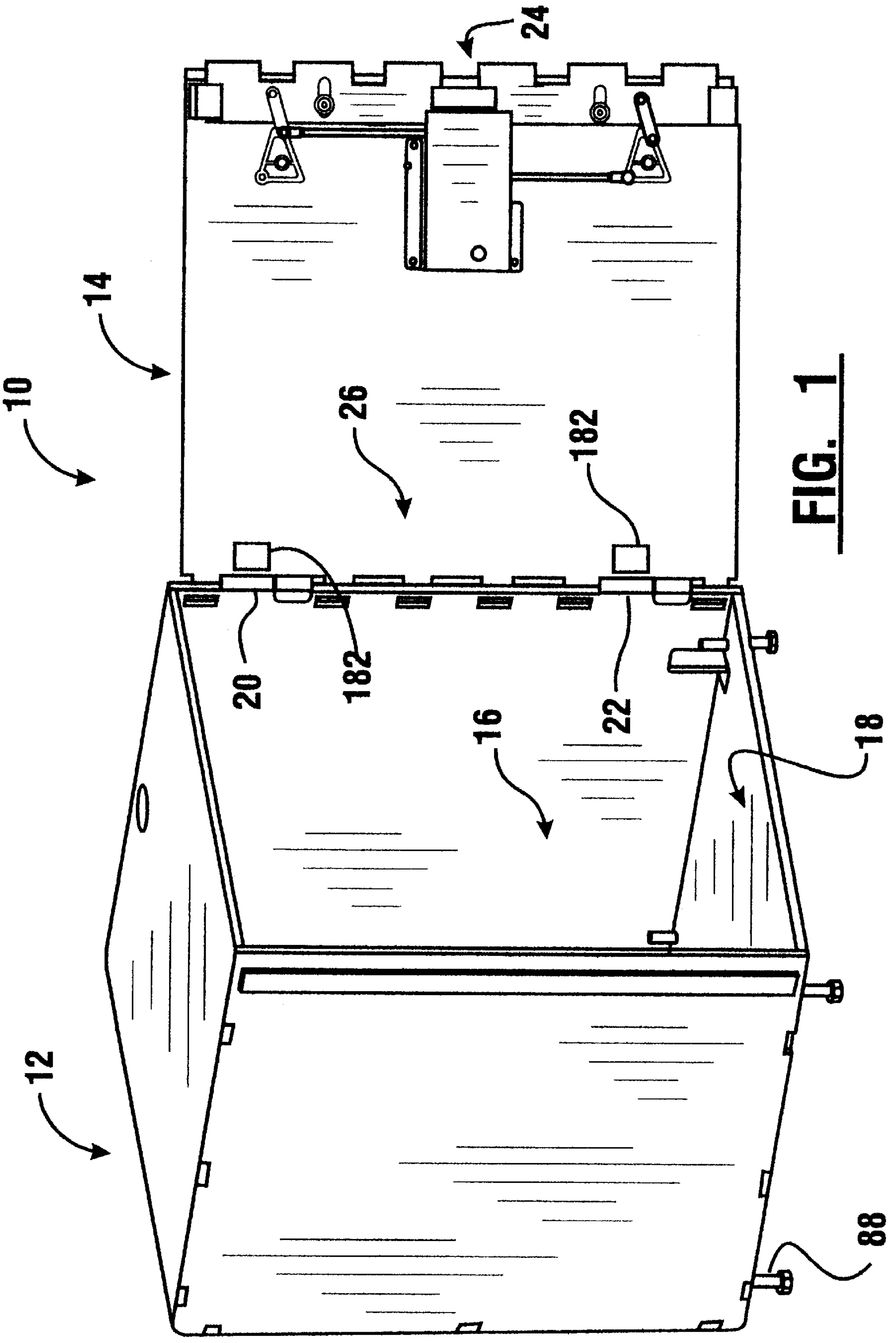
FIG. 1 is an isometric view of a secure enclosure for an automated banking machine of the preferred embodiment of the present invention, with a door thereof in an open condition.

Referring now to the drawings and particularly to FIG. 1, there is shown therein a secure enclosure for an automated banking machine of a preferred embodiment of the present invention, generally indicated 10. It should be understood that the secure enclosure is part of a larger automated banking machine, such as an ATM or similar apparatus. The secure enclosure includes a generally rectangular chest portion 12 and a moveable door 14. The chest portion 12 bounds an interior area 16 which has an opening 18 at a rear side of the chest. Door 14 is sized for closing opening 18. Door 14 is attached to chest portion 12 by an upper hinge assembly 20 and a lower hinge assembly 22.

Door 14 has mounted thereon a locking bolt mechanism 24. Door 14 further includes a dead bolt portion 26. The locking bolt mechanism 24 and the dead bolt portion 26, as later described in detail, are operative to secure the door in position closing opening 18.

Figure 3:
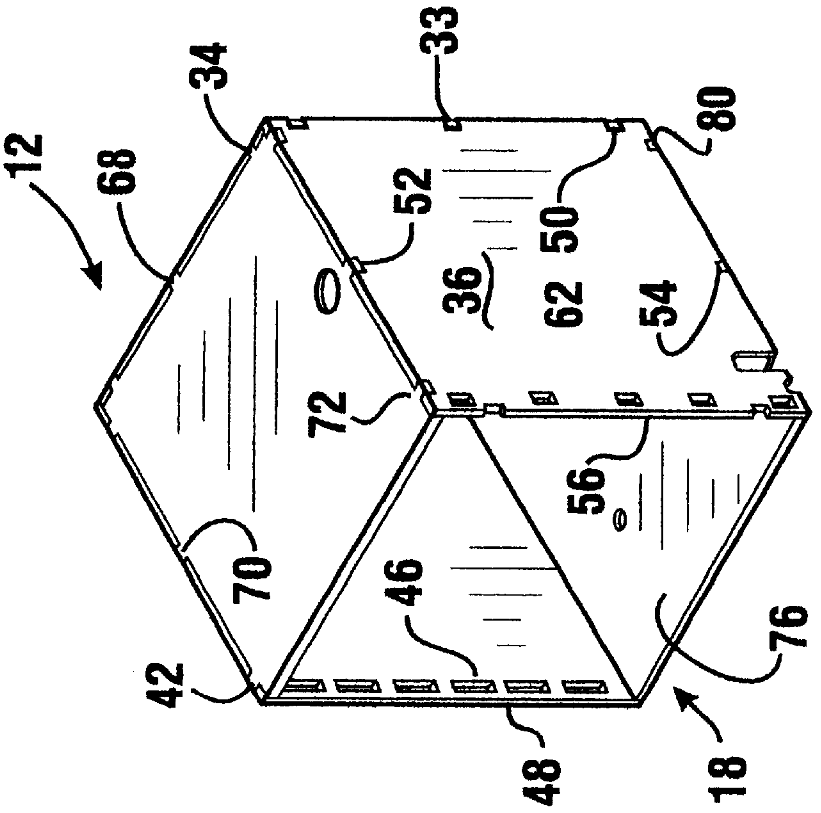
FIG. 3 is an isometric rear view of the secure enclosure shown without the door.
Figure 2:
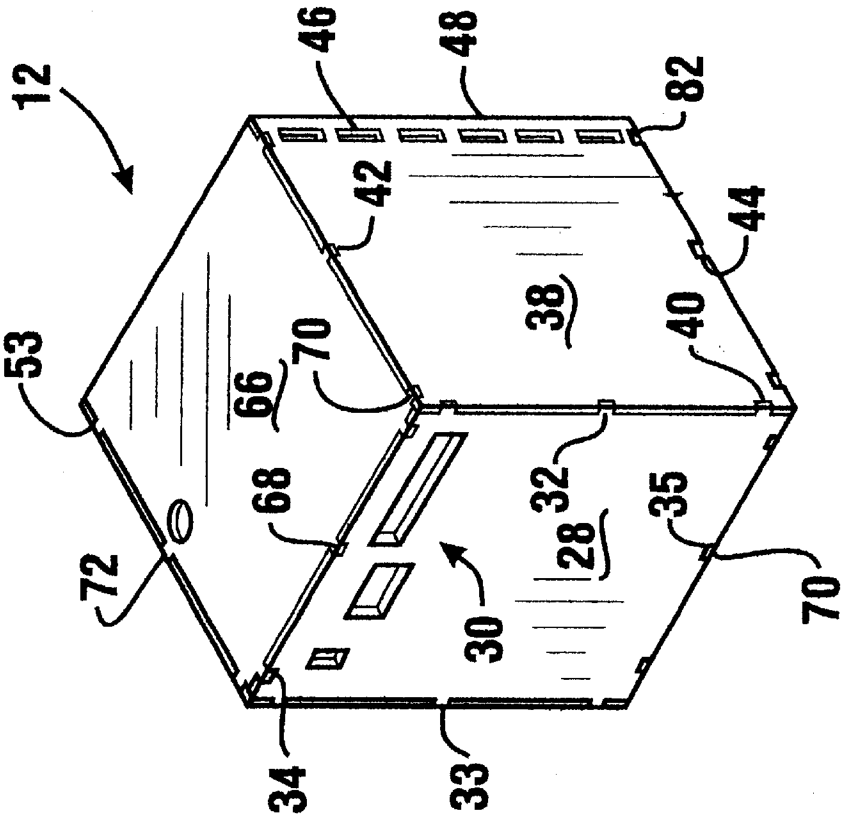
FIG. 2 is an isometric front view of the secure enclosure shown in FIG. 1.

As shown in FIGS. 2 and 3 the chest portion of the secure enclosure includes a front panel 28. Front panel 28 in the preferred embodiment faces the customer side of the ATM. The front panel 28 includes openings 30. The openings 30 are sized for cooperating with mechanisms in the ATM. These mechanisms include for example, a mechanism that delivers cash or other valuable items to a customer. For example, a supply of cash may be maintained within the secure enclosure in the ATM, and a picker mechanism may be provided for delivering the currency bills that have been properly requested by a customer. The bills are delivered out of the secure enclosure through one of the openings 30 to a mechanism in the ATM which delivers the money to the customer.

Other openings in the front panel 28 are used in connection with the mechanism that receives deposits from customers. Customers insert deposits through an opening in a fascia of the ATM, and a mechanism delivers the deposit envelopes through an opening in the front panel 28 to a mechanism within the chest portion. Generally the mechanism places the deposit envelopes in a secure removable container within the enclosure. Openings 30 in the panel 28 also provide access for electronic cabling which communicates with the components inside the chest. Such cabling is used to transmit the signals that control the operation of the cash dispensing and depository mechanisms. In addition, wiring harnesses and other cabling provide connections to alarm devices and other equipment that is housed within the secure enclosure.

Figure 4:
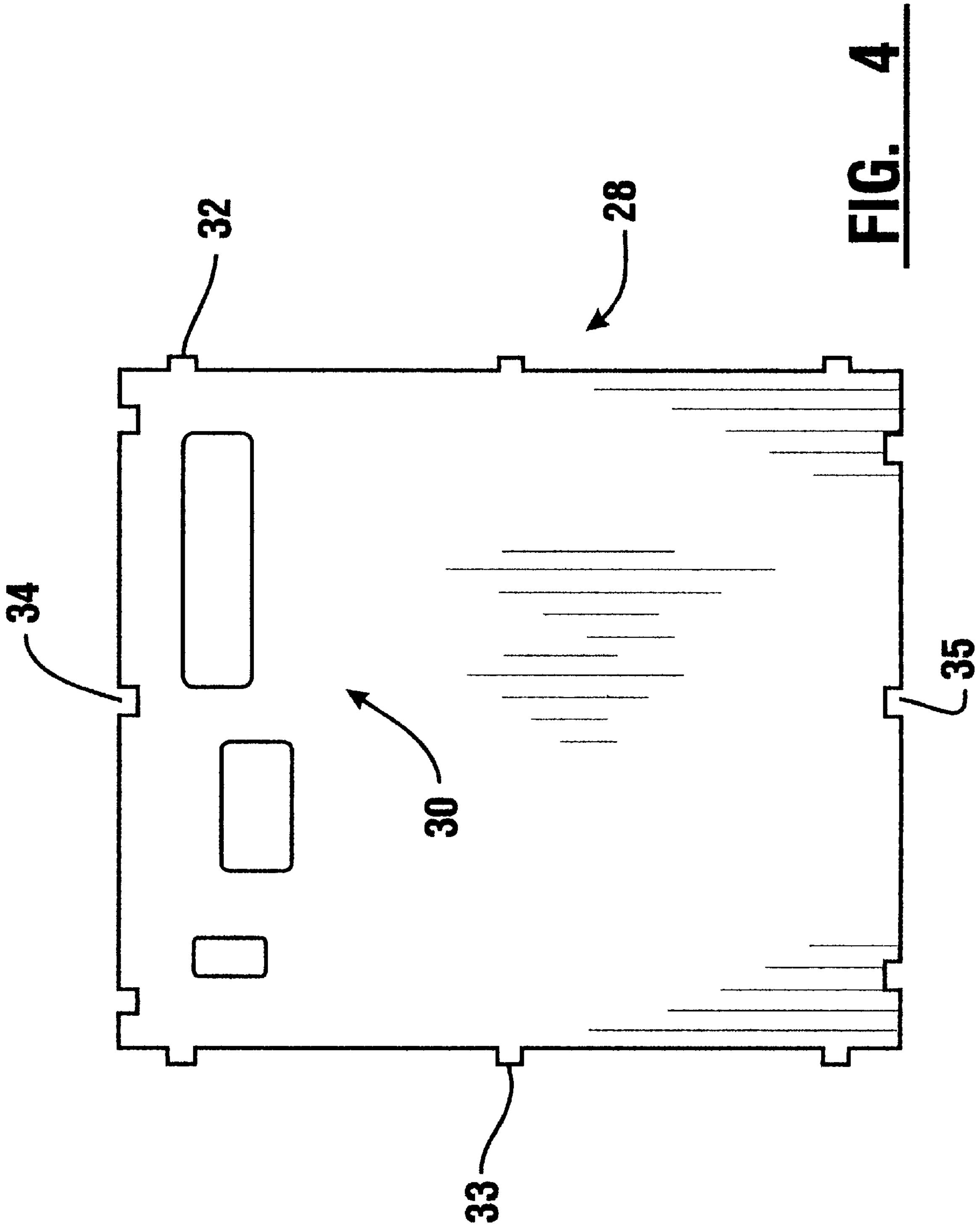
FIG. 4 is a plan view of a front panel of the secure enclosure.

Front panel 28 is shown separately in FIG. 4. Front panel 28 includes projections 32, 33 which extend outward from its side edge surfaces. Panel 28 further includes recesses 34 in its upper edge surface and recesses 35 in its lower edge surface. The projections 32, 33 and recesses 34, 35 are precisely sized and located for purposes of insuring the proper assembly of the chest in a manner which is later explained.

Figure 5:
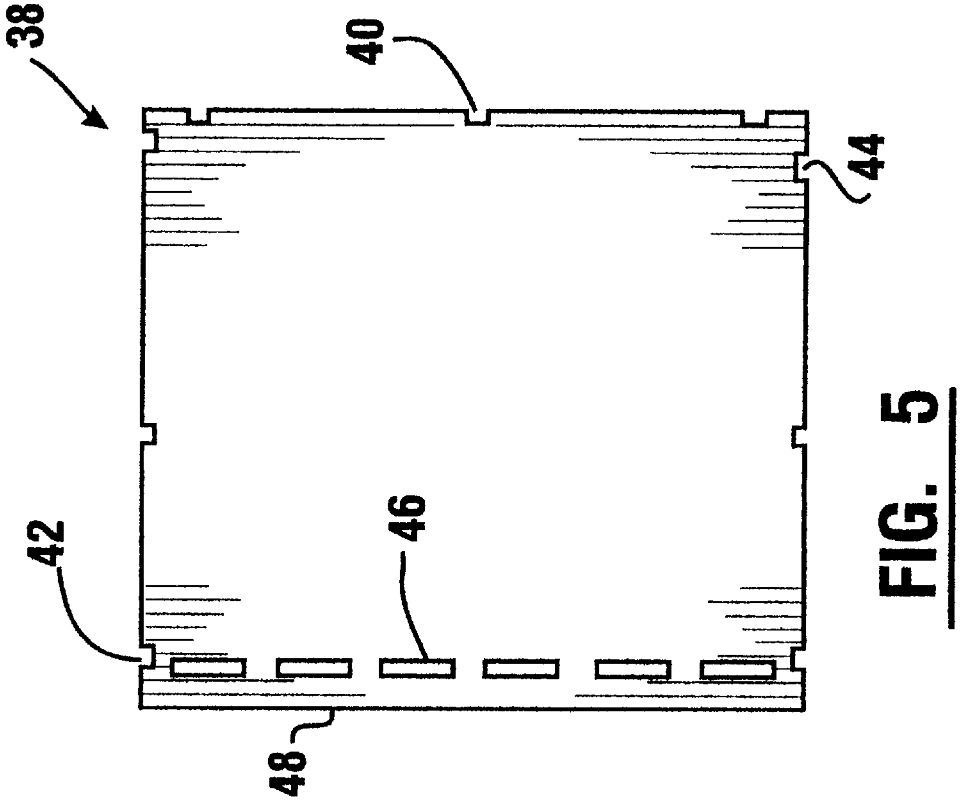
FIG. 5 is a plan view of a striker side panel of the secure enclosure.

The chest portion 12 further includes a hinge side panel 36 and a striker side panel 38. The hinge side and striker side panels extend generally parallel from front panel 28. As shown in FIG. 5, striker side panel 38 includes recesses about its periphery. Recesses 40 are positioned at a front edge surface of striker panel 38. Recesses 40 are sized to accept projections 32 of the front panel therein in precise close fitting relation, as shown in FIG. 2. Striker side panel 38 further includes recesses 42 in its upper edge surface, and recesses 44 in its lower edge surface. Recesses 42 and 44 are also precisely sized and positioned.

Striker side panel 38 further includes a plurality of vertically aligned locking bolt apertures 46. Locking bolt apertures 46 preferably extend through the striker side panel at a position that is somewhat disposed inwardly from a front surface 48 of the panel which bounds the opening 18. Locking bolt apertures 46 are sized for accepting therein projections on a locking bolt in a manner later explained.

Figure 6:
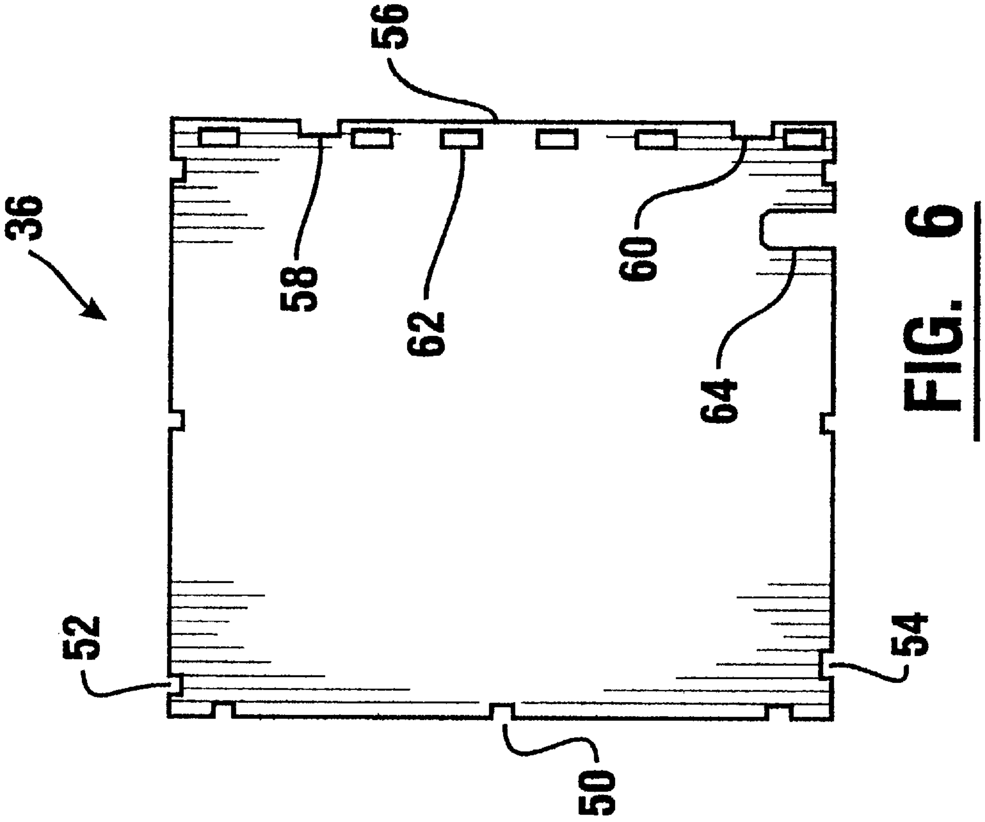
FIG. 6 is an isometric view of a hinge side panel of the secure enclosure.

Hinge side panel 36 is shown in a plan view in FIG. 6. Hinge side panel 36 includes recesses 50 in its forward edge surface. Recesses 50 are sized for accepting projections 33 of the front panel therein in close fitting relation. Hinge side panel 36 also includes recesses 52 in its upper edge surface and recesses 54 in its lower edge surface. Recesses 52 and 54 as with the recesses and projections on other panels, are precisely sized and positioned.

Hinge side panel 36 further includes a front surface 56. Front surface 56 includes an upper cut out 58 and a lower cut out 60. Upper cut out 58 is sized for mounting an upper chest hinge therein, which is part of the upper hinge assembly 20. Lower cut out 60 is sized for mounting a lower chest hinge which is part of the lower hinge assembly.

Hinge side panel 36 further includes a plurality of dead bolt apertures 62. Dead bolt apertures 62 are generally vertically aligned and somewhat disposed from the front surface 56. Dead bolt apertures 62 are sized for accepting dead bolt projections on door 14 therein in close fitting aligned relation as later explained. It should also be noted that hinge side panel 36 also includes an opening 64 therethrough for purposes of providing electrical or mechanical connection to equipment and mechanisms within the secure enclosure.

Figure 7:
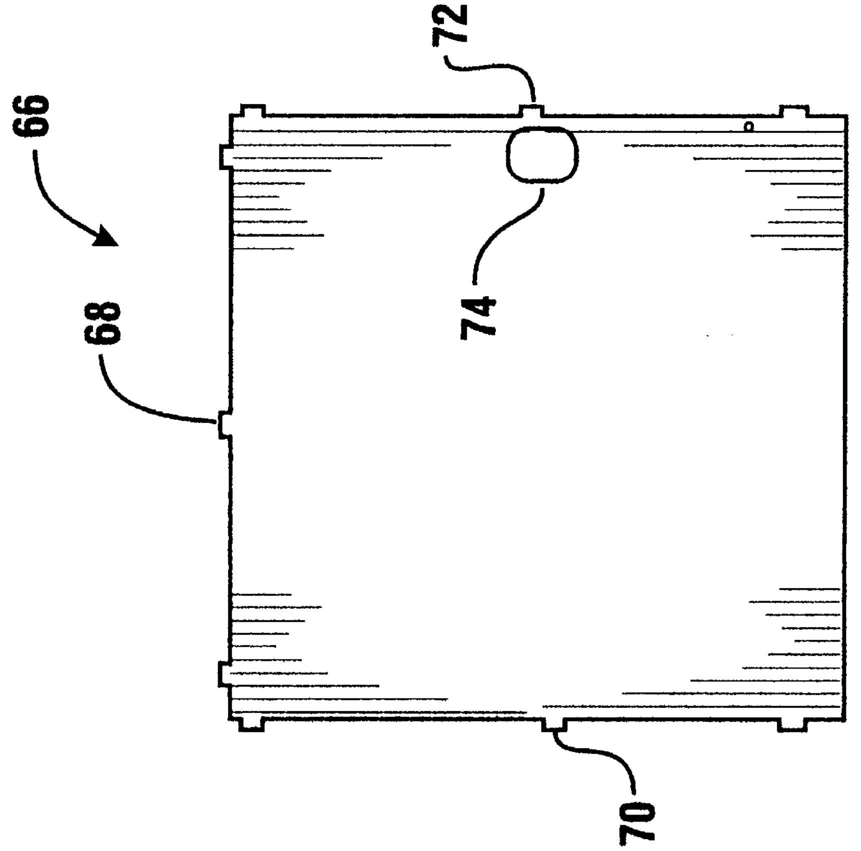
FIG. 7 is a plan view of a top panel of the secure enclosure.

Chest portion 12 further includes a top panel 66. Top panel 66, as shown in FIG. 7, includes projections 68 on its forward edge surface.

Projections 68 are positioned and sized for precise acceptance within recesses 34 of the front panel. Top panel 66 further includes projections 70. Projections 70 are sized for precise interfitting relation with recesses 42 in the striker side panel 38. Top panel 66 further includes projections 72. Projections 72 are sized for precise interfitting engagement with recesses 52 in the hinge side panel 36. Top panel 66 further includes an opening 74 for providing access between the components within the secure enclosure and other components of the ATM of which the enclosure is a part.

Figure 8:
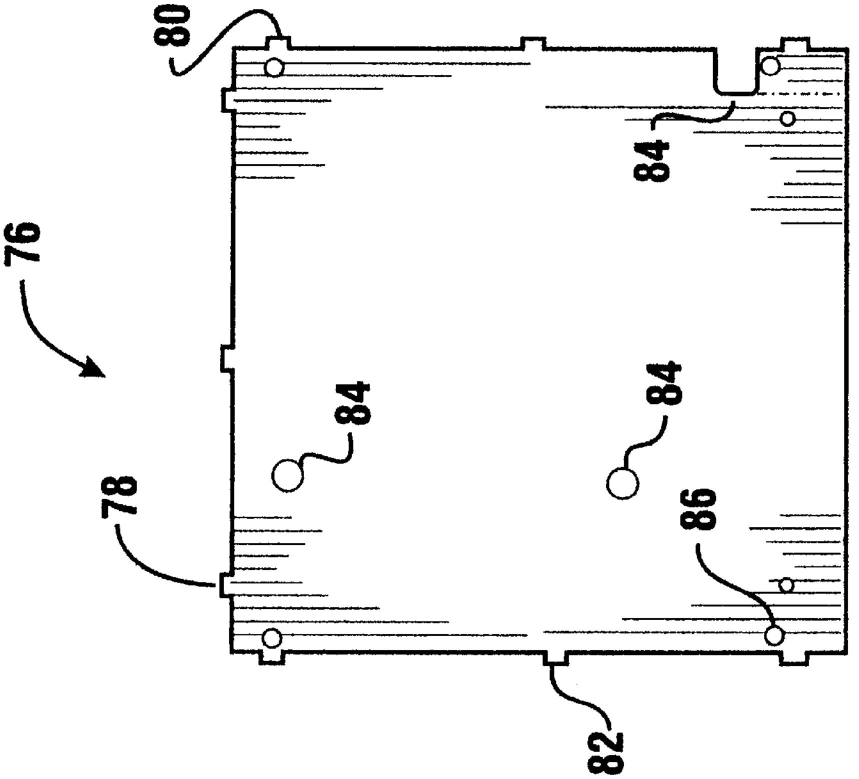
FIG. 8 is a plan view of a bottom panel of the secure enclosure.

Chest portion 12 further includes a bottom panel 76. Bottom panel 76, which is shown in greater detail in FIG. 8, includes projections 78 on its front edge surface. Projections 78 are sized and positioned for precise interengaging relation with recesses 35 on front panel 28. Bottom panel 76 further includes projections 80. Projections 80 are sized for precise interengaging relation with recesses 54 of the hinge side panel 36. Bottom panel 76 also includes projections 82. Projections 82 are sized for precise interfitting engagement with recesses 44 of the striker side panel 38.

It should be noted that bottom panel 76 includes access openings 84 for purposes of providing connections to the items within the secure chest. In addition, bottom panel 76 includes four foot mounting openings 86. Foot mounting openings 86 accept adjustable feet 88 shown in FIG. 1. Adjustable feet 88 may be adjusted vertically for purposes of leveling and positioning the ATM of which the secure enclosure 10 is a part.

The process of assembling the chest portion 12 of the secure enclosure is graphically represented in FIGS. 9 through 13. The method of assembling the chest portion 12 includes a fixture generally indicated 90 in FIG. 9. Fixture 90 includes a first support plate 92 and a second support plate 94. Support plates 92 and 94 are preferably arranged at generally a 90° angle. At least one of support plates 92 and 94 include magnets with contact surfaces that are adjacent the inward facing surfaces of plates 92 and/or 94. The magnets are used to hold the panels of the preferred embodiment of the enclosure adjacent to the support plates during fabrication. Magnets are used because the preferred embodiment of the secure enclosure 10 is comprised of steel panels. Of course in other embodiments other equivalent means for holding panels adjacent to the support plates 92 or 94 may be used. These may include any device or mechanism which is operative to hold a panel adjacent thereto, such as for example, suction cups, mechanical tabs and releasable adhesive materials.

The preferred form of fixture 90 also includes a pair of side guides 96. Side guides 96 are positioned in opposed relation to support plate 94. In preferred embodiments of the invention, side guides 96 are preferably movably mounted on the fixture. This enables selectively positioning side guides 96 from support plate 94 a distance which is tailored to the particular secure enclosure being made. This may be accomplished by a suitable guide mechanism such as a rotating screw which can be locked in place once it is moved to a desired position. Of course in other embodiments of the invention side guides 96 may be fixed relative to fixture 90, in which case the fixture is suitable for making only one size of secure enclosure.

Fixture 90 further includes a pair of top guides 98. Top guides 98 are similar to side guides 96 except that they are positioned in opposed relation to support plate 92. Like side guides 96, top guides 98 may be made moveable relative to support plate 92, but in embodiments of the fixture 90 which are made for one particular size, may be fixed.

Figure 9:
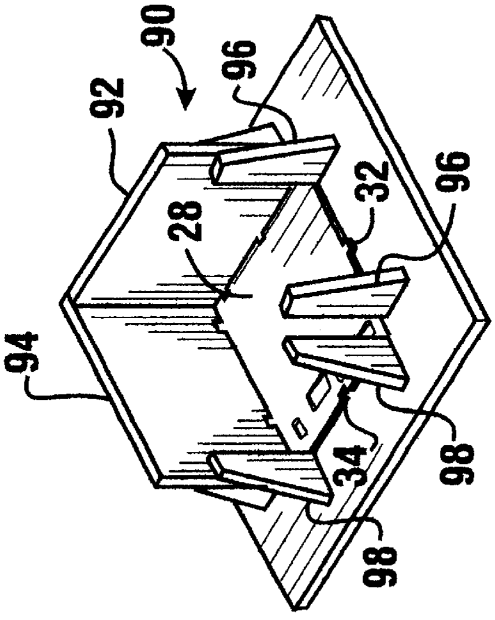
FIGS. 9 through 13 show steps in the method of assembling the panels of the secure enclosure of the preferred embodiment of the present invention.

The process of making the secure enclosure begins with fabricating the panels to include the desired arrangement of unique interengaging protections and recesses for each of the types of ATMs to be made. The locations of the supports in fixture 90 are adjusted to accommodate the particular type of enclosure. As shown in FIG. 9 the placement of panels begins with the placement of front panel 28. In fixture 90 front panel 28 is positioned so a corner is aligned with the intersection of support plates 92 and 94. The side guides 96 are spaced in close adjacent relation with projections 32 on the front panel, and top guides 98 are positioned adjacent to the top surface of the front panel which includes recesses 34. The front panel 28 is positioned in the fixture 90 such that the surface of the front panel that is directed outwardly when the ATM is assembled, is face down in fixture 90. This positioning may be further assured in certain embodiments by including projections that extend from the base of the fixture into openings in the properly positioned front panel.

Figure 10:
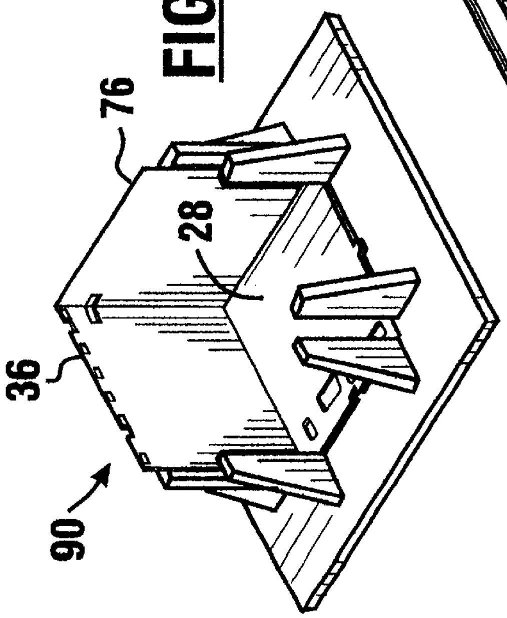

The next step in the method of assembling the enclosure is shown with reference to FIG. 10. Bottom panel 76 is positioned adjacent to support plate 92. Bottom panel 76 is positioned so that projections 78 extend in recesses 35 of the front panel. This is possible because the size and location of the projections and recesses are made to provide a close interengaging fit. Bottom panel 76 is held adjacent to support plate 92 by the magnets therein. Similarly, hinge side panel 36 is positioned in fixture 90 adjacent to support plate 94. Support plate 94, because it also preferably includes magnets, is operative to assist in holding and positioning hinge side panel 36. Hinge side panel 36 is positioned in fixture 90 so that recesses 54 engage projections 80 on the bottom panel. Likewise, recesses 50 in the hinge side panel engage projections 33 on the front panel 28. Again, because all of the projections and recesses are positioned to be in precise interengaging relation, the panels can be fitted together in only the proper orientation.

Figure 11:
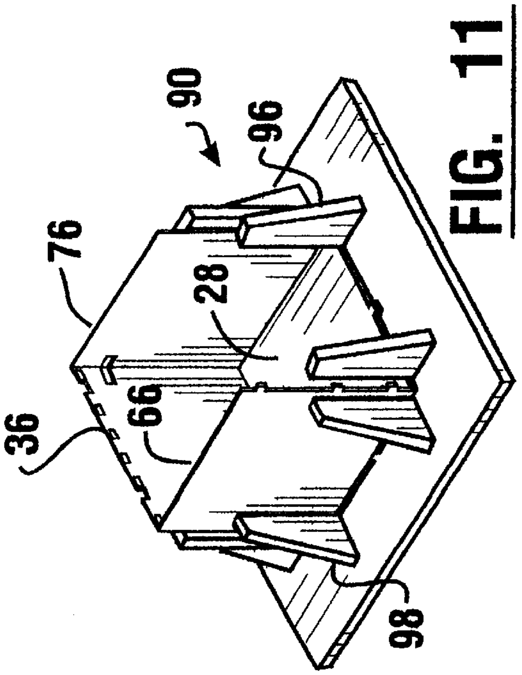

The next step in the method of assembling the chest portion of the secure enclosure is shown with regard to FIG. 11. In FIG. 11 top panel 66 is positioned adjacent to top guides 98. Top panel 76 is positioned so that projections 72 engage recesses 52 in the hinge side panel 36. Similarly, projections 68 on the top panel 76 engage recesses 34 on the front side panel. The precise interengaging relation of the projections and the recesses are operative to hold top panel 76 in position in fixture 90.

Figure 12:
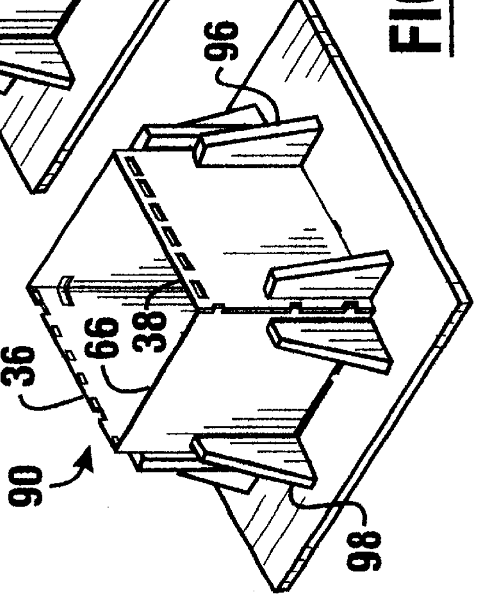

The next step in the method of assembling the chest portion of the secure enclosure is shown in FIG. 12. The striker side panel 38 is positioned adjacent to side guides 96. The recesses 42 in striker side panel 38 are engaged with the projections 70 on the top panel. Similarly, recesses 40 in the striker side panel are engaged with projections 32 on the front panel. Finally, projections 82 on the bottom panel are engaged with recesses 44 in the striker side panel. Again, this precise interfitting relation between the projections and the recesses ensures that the panels are located properly.

Figure 13:
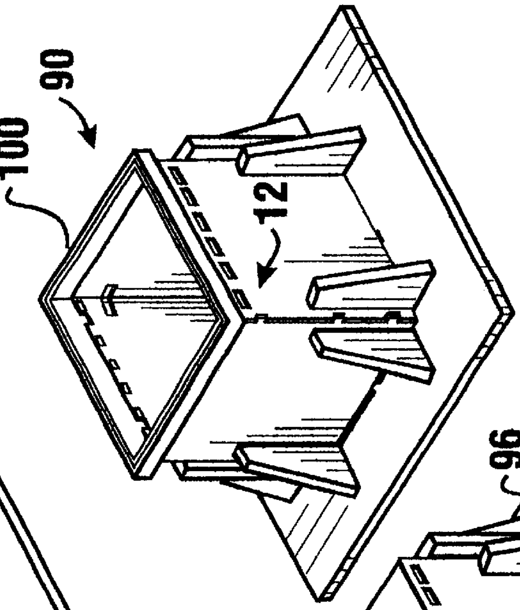

The next step in the method of assembling the chest portion is shown with reference to FIG. 13. An open rectangular top frame 100 is positioned over the front surfaces of all the panels. The frame extends both inside and outside of the enclosure. Frame 100 is sized for holding the panels in their proper orientation. Top frame 100 along with the other components of the fixture, as well as the interengaging nature of the panels themselves, serve to hold the panels of the chest portion in proper position so that the panels may be welded or otherwise secured together. This secure attachment enables the assembly to be moved, such as along an assembly line, so that welds may be accomplished by automated equipment in the precise locations necessary for securing the panels together. Even if the welding process is done manually, the secure attachment of the panels in the fixture serves to hold the panels in the proper aligned relationship until the welding operations can be completed. The welds are preferably made on the interior surfaces of the panels. Once the welds are complete the frame 100 is removed and the assembled chest portion 12 is released from the fixture 90.

It should be understood that in the preferred embodiment of the invention the panels which comprise the chest portion are made to have uniquely sized and positioned recesses and projections that correspond to the particular type of enclosure being manufactured. These interengaging projections and recesses ensure that only the correct panels for purposes of making the particular type enclosure may be assembled. In addition, the recesses and projections limit the assembly of the particular enclosure to only one manner of assembly. This novel approach minimizes the risk that panels from different types of secure enclosures, which are similarly sized, will be inadvertently assembled together. In addition, it reduces scrap and the need for rework as a result of panels being put together backwards or otherwise improperly.

In a preferred embodiment of the invention the panels are fabricated by being precisely cut from a flat stock with a laser or other suitable cutting apparatus. This enables accurately sizing and positioning the edges as well as the projections and recesses. The cutting apparatus preferably operates pursuant to a programmable control system which ensures that panels of a particular type are virtually identical. In addition, because panels may be cut from similar stock, only the panels needed for the particular type of ATM machines that are to be made need to be produced from the raw flat stock material. This minimizes the amount of inventory that needs to be maintained on hand at a manufacturing facility.

A further novel aspect of the preferred embodiment of the secure enclosure for an automated banking machine of the present invention is the locking bolt mechanism 24. Locking bolt mechanism 24 is operative to selectively enable securing door 14 in a locked position. The locking bolt mechanism 24 is shown in greater detail in FIGS. 14 through 17.

Locking bolt mechanism 24 includes a locking bolt 102. Locking bolt 102 includes a plurality of locking bolt projections 104 thereon. Locking bolt 102 further includes a pair of elongated slots 106 and a central cut out 108 therein.

Locking bolt 102 is mounted on door 14 so as to be slidably moveable in guided relation on a top guide 110 and a bottom guide 112. Top guide 110 and bottom guide 112 are generally unshaped in cross section and surround and guide the top and bottom ends of the locking bolt respectively in a moveable saddle type relation. A center guide 114 which is generally "H-shaped" in cross section, accepts central cut out 108 of the locking bolt therein in moveable guided relation. The central cut out extends from an outer surface bounding the bolt. This mounting enables the locking bolt 102 to slide back and forth in the cooperating recesses of the top guide 110, the lower guide 112 and the center guide 114. The guides are all preferably securely attached to the door 114, such as by welding.

It should be noted that the locking bolt 102 further includes a guard projection 116 connected thereto. Guard projection 116 extends opposite central cut out 108 and behind the back surface of the locking bolt 102. The function of guard projection 116 will be later explained in detail.

The locking bolt mechanism 24 further includes a pair of spaced rotatable idler cams. An upper idler cam 118 is rotatably mounted through a suitable fastener to a threaded opening in a boss on door 14. A lower idler cam 120 is rotatably mounted to a similar boss on the door. A drive cam 122 is connected to a handle 124. Handle 124 is attached to a shaft portion which extends through an opening in door 14 and attaches to drive cam 122. Drive cam 122 is enabled to be rotated by movement of handle 124 when a lock is in an open condition as later discussed.

Door 14 also has mounted thereto a lock 126. Lock 126 includes a lock bolt 128. Lock bolt 128 is a member that is moveable between a position in which it extends from the case of lock 126 when lock 126 is in the closed condition. Lock bolt 128 is retracted into the case of lock 126 when the lock is in the open condition. A dial 130 has a shaft extending therefrom. The shaft attached to dial 130 extends through an opening in door 14 and into the case of lock 126. A ring 132 is mounted to the outer face of door 14 for purposes of supporting and surrounding dial 130. In the preferred embodiment, dial 130 is a dial which is suitable for entering a combination into lock 126. When the proper combination is entered by turning dial 130, the lock is enabled to be changed from the closed (locked) condition wherein lock bolt 128 extends from the case of the lock, to an open (unlocked) condition in which the lock bolt is retracted.

Figure 15:
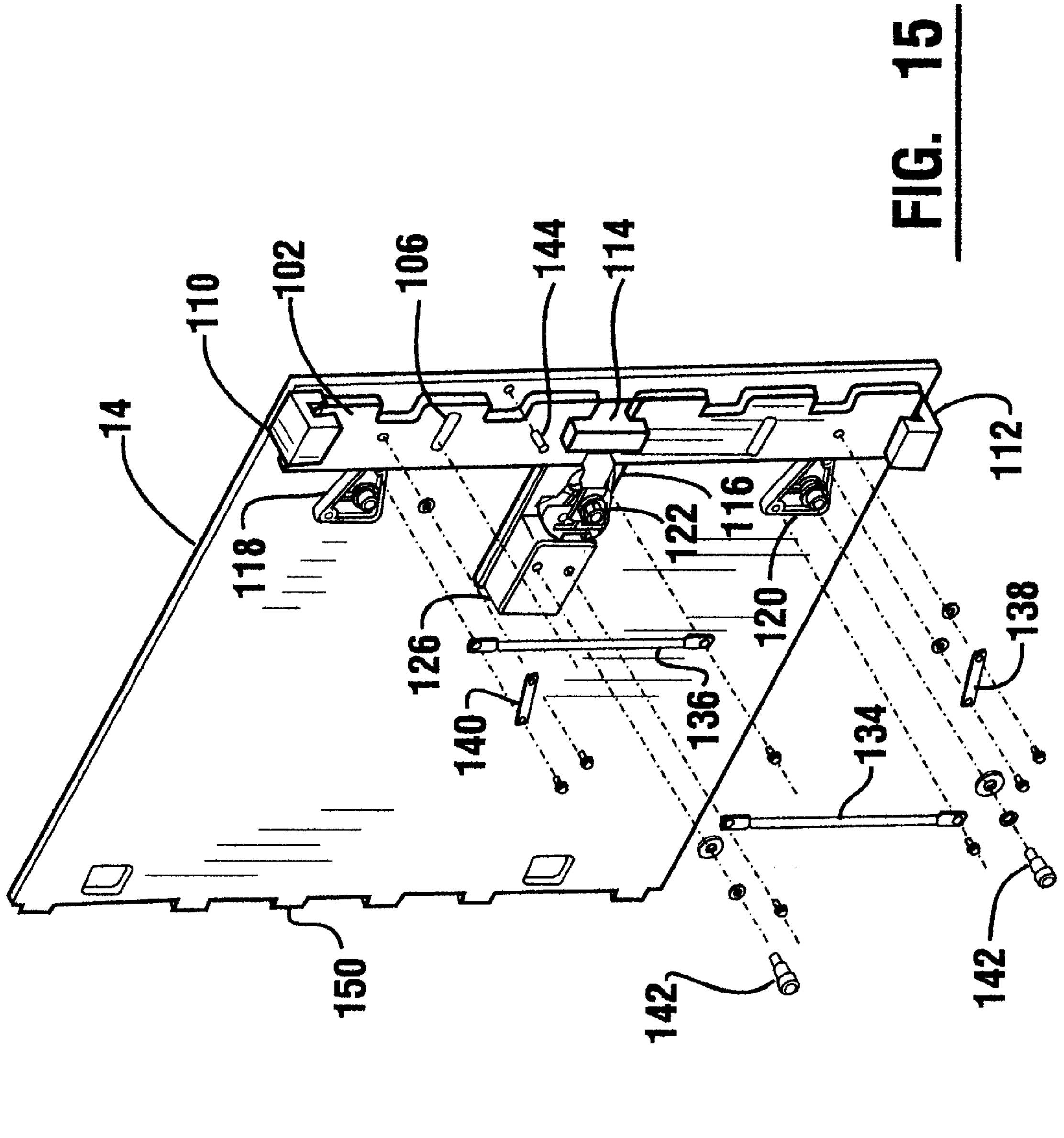
FIG. 15 is an isometric exploded view of the door of the secure enclosure of the present invention showing further components of the locking bolt mechanism in addition to those shown in FIG. 14.

The locking bolt work mechanism is shown in further detail in FIG. 15. The drive cam 122 is connected to the lower idler cam 120 by a first long link (L-Link) 134. Similarly, drive cam 122 is connected to upper idler cam 118 with a second long link 136. It should be appreciated that the long links enable the upper and lower idler cams to rotate in coordinated relation with the drive cam 122.

Lower idler cam 120 is further connected to locking bolt 102 by a lower short link (S-Link) 138. Similarly, upper idler cam 118 is connected to locking bolt 102 by an upper short link 140.

Slots 106 in locking bolt 102 accept shoulder bolts 142 therein. The shoulder bolts extend into threaded bosses openings in bosses on the safe door 14. The shoulder bolts further support the locking bolt 102 and enable the bolt to slide in supported relation thereon. The shoulder bolts enable the bolt to move while being guided by and confined in the top guide 110, lower guide 112 and center guide 114.

A travel limiting pin 144 is accepted in an opening in door 14 and extends inwardly from the inner surface of the door. Travel limiting pin 144 is movably adjustable and operates to limit the inward movement of the door as later discussed.

Figure 24:
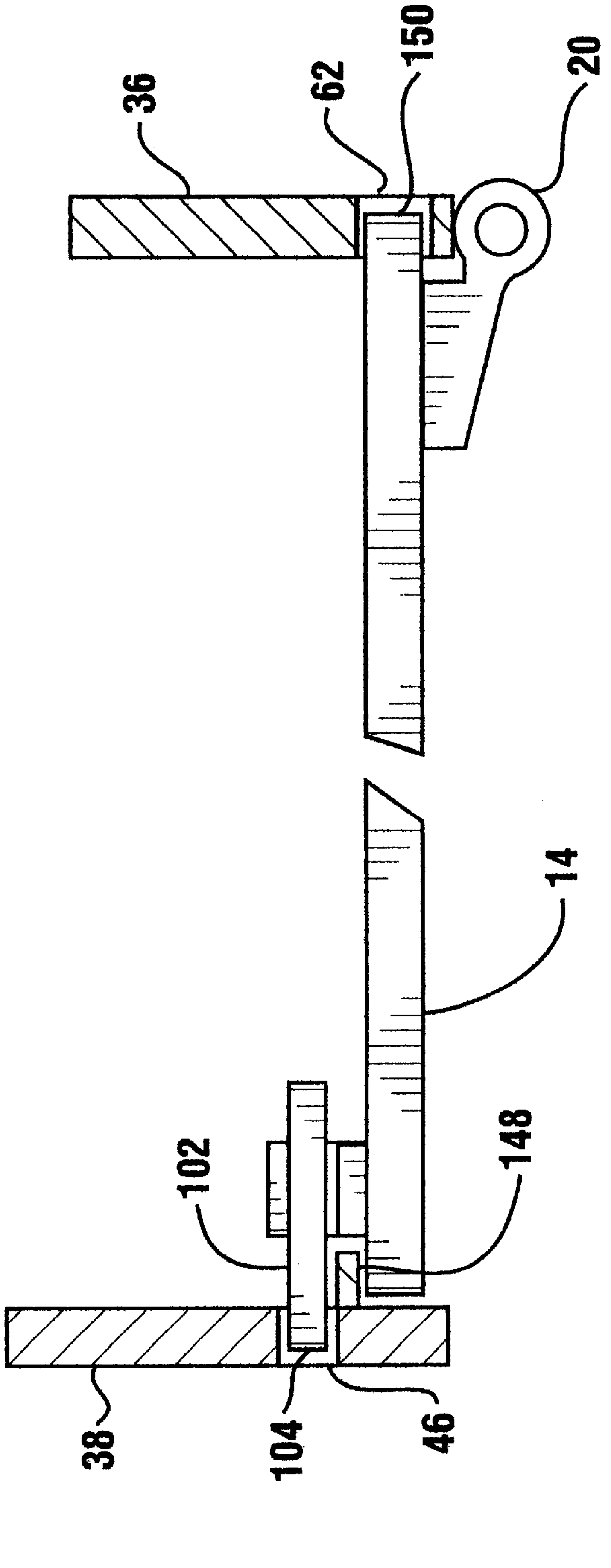
FIG. 24 is a partial cross sectional view of the secure enclosure of the present invention with the door in the closed position and the locking bolt in an extended position.

The operation of the locking bolt mechanism is now explained with reference to FIGS. 16 and 17. The drive cam 122 includes a cut out 146 in its outer periphery. Cut out 146 is sized for accepting lock bolt 128 therein when the lock bolt is extended. As a result, when lock 126 is in the secure, closed condition and lock bolt 128 is extended into cut out 146, locking bolt mechanism 124 is prevented from moving and secured in the position shown in FIG. 16. In this position it should be noted that the locking bolt projections 104 are extended outwardly. When the door is closed this enables the locking bolt projections to be engaged in locking bolt apertures 46 in the striker side panel 38 of the chest portion. The interengagement of the locking bolt apertures 46 and the locking bolt projections 104 is shown in FIG. 24. It will be noted in FIG. 24 that the inward movement of door 14 is preferably limited to the position wherein the locking bolt projections and apertures 46 are aligned. This is accomplished through use of a striker plate 148 which is attached to the striker side panel. The pin 144 is adjustable to provide accurate alignment.

Figure 16:
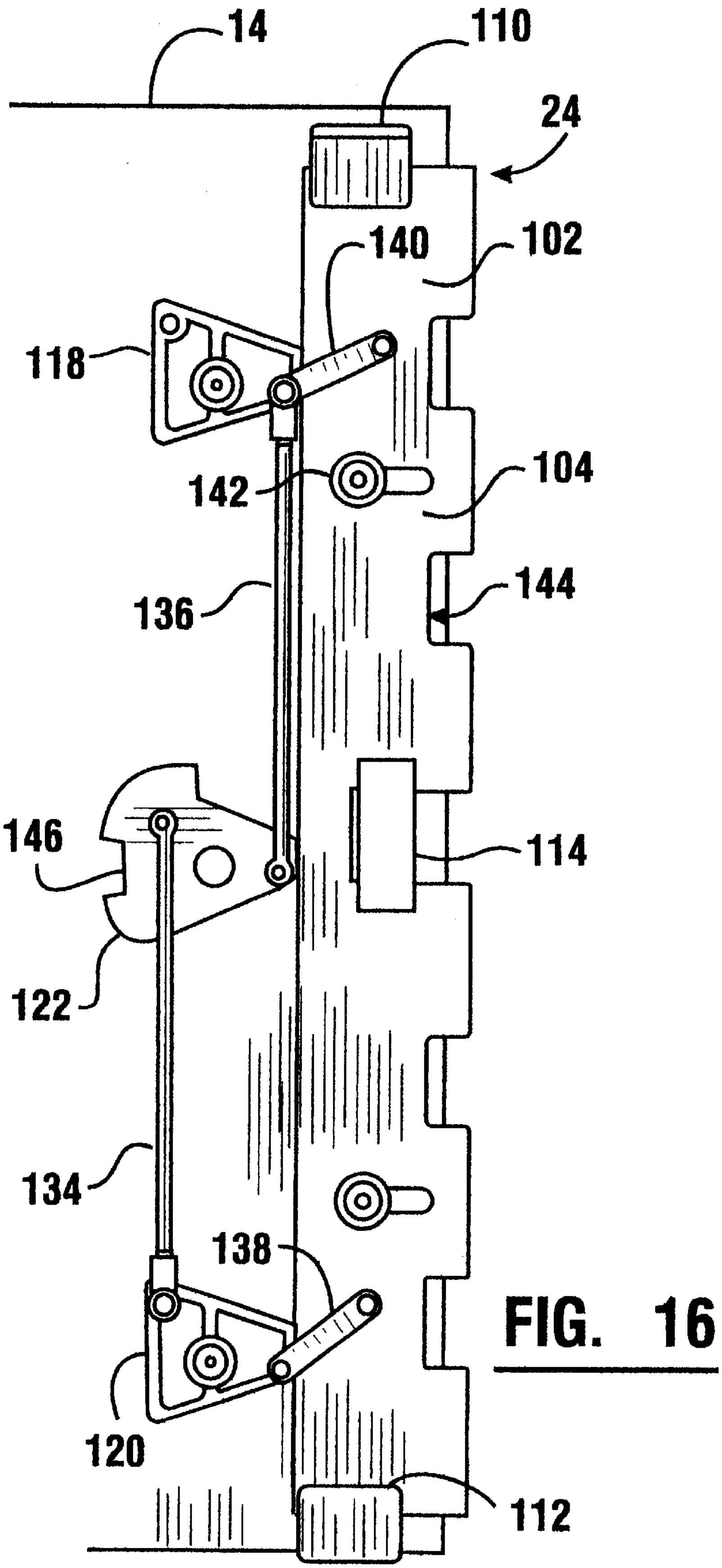
FIG. 16 is a plan view of the locking bolt mechanism shown in a secure condition.
Figure 17:
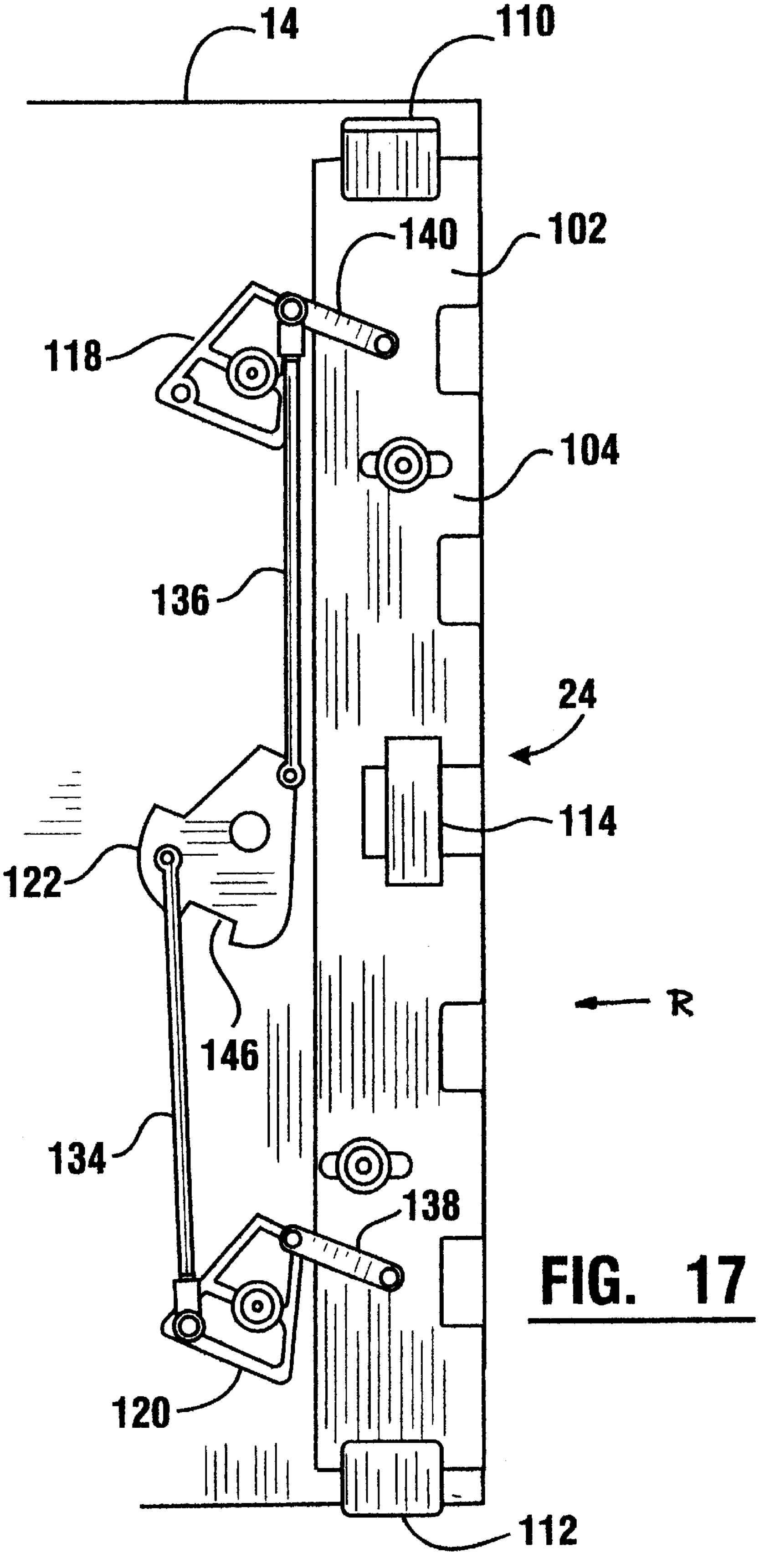
FIG. 17 is a plan view of the components of the locking bolt mechanism shown in an open condition.

In the secure extended position of the locking bolt 102 shown in FIG. 16, top idler cam 118 and lower idler cam 120 have front surfaces that are in abutting or close adjacent relation with a back surface of locking bolt 102. A front surface of drive cam 122 is similarly in abutting or close adjacent relation with the back surface of the locking bolt. This serves to resist movement of the locking bolt from the extended secure position shown in FIG. 16. The configurations of the drive cam and idler cams which include converging side walls which extend to the respective front surfaces, enable the cams to be positioned and moved in the manner shown.

It should also be noted that in the secure position of the locking bolt 102 shown in FIG. 16 that the short links 138 and 140 extend in an "over center" relation relative to their respective idler cams. This over center positioning of the short links provides that during initial rotational movement of either idler cam in a direction that would tend to retract the locking bolt 102, the locking bolt actually moves slightly further outwardly rather than inwardly. As will be appreciated from the orientation of the components, significant rotational movement of the idler cams 118 and 120, as well as the drive cam 122, is required to retract the locking bolt a significant distance. This provides enhanced resistance to attack by burglars as slight movement of the cams or links will not enable significant movement of the locking bolt toward the retracted position.

As shown in FIG. 16, the configuration of the top guide 110, lower guide 112 and center guide 114, as well as the shoulder bolts 142, serve to hold the locking bolt attached to the door. This further minimizes the vulnerability of the locking bolt mechanism to attack.

It should also be noted that in the extended position of the locking bolt shown in FIG. 16, the guard projection 116, which is attached to the locking bolt, extends as shown in FIG. 15 behind the drive cam 122. This further minimizes the vulnerability of the locking bolt mechanism 24 to attack through efforts to dislodge the drive cam 122.

Figure 14:
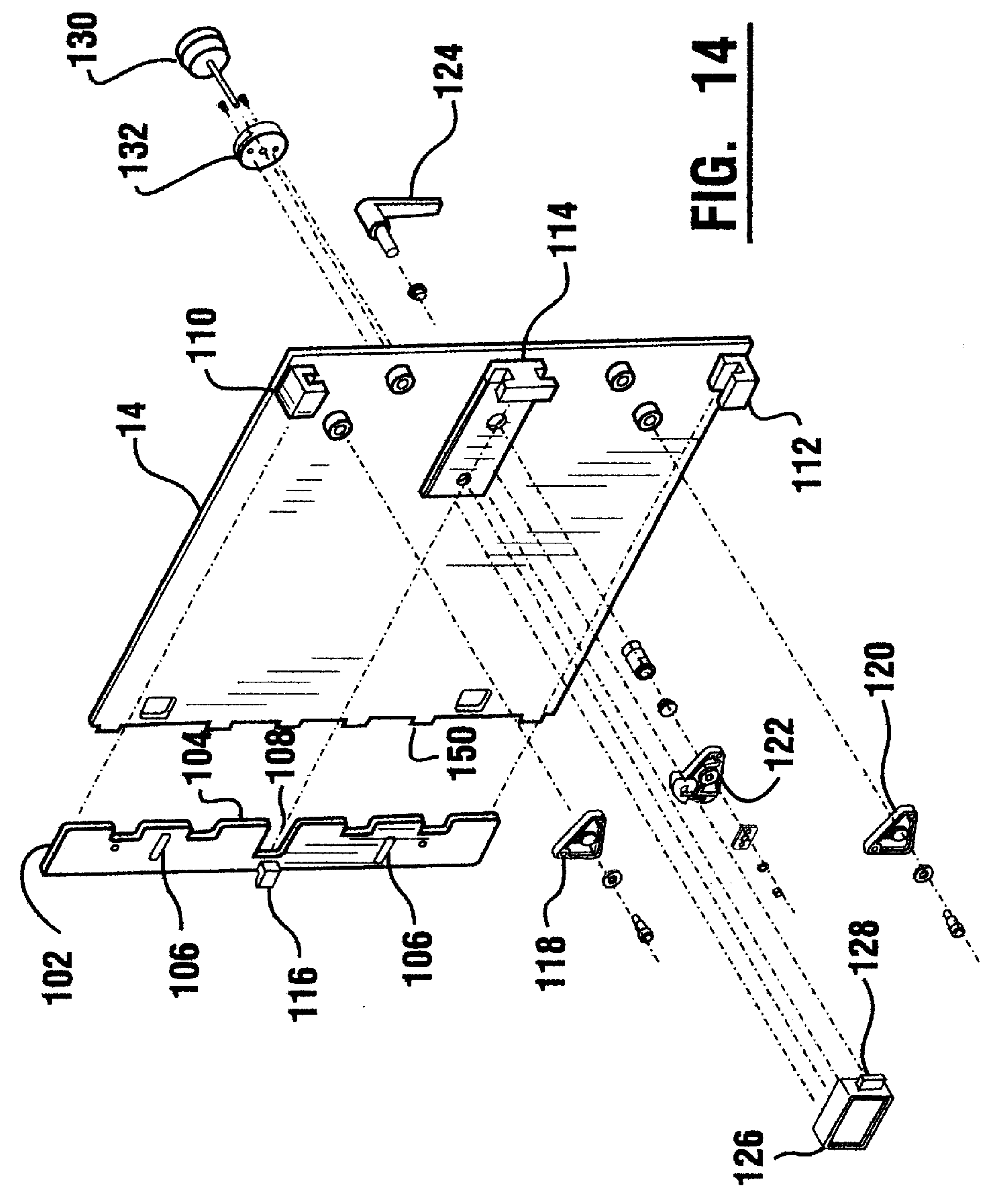
FIG. 14 is an isometric exploded view of the door of the secure enclosure of the present invention including components of the locking bolt mechanism.

As previously discussed, the locking bolt 102 is held in the secure position shown in FIG. 16 by the engagement of the lock bolt 128 with the cut out 146 in drive cam 122. When lock bolt 128 is retracted responsive to imputing the correct combination through dial 130 into lock 126, the drive cam 122 is enabled to be rotated by handle 124. The rotation of handle 124 in a clockwise direction, as shown in FIG. 14, rotates drive cam 122 counter-clockwise from the position shown in FIG. 16. This counter-clockwise rotation of the drive cam moves long link 136 in an upward direction and long link 134 in a downward direction. This movement rotates idler cams 118 and 120 in a counter-clockwise direction. The rotation of the idler cams moves short links 138 and 140 to retract locking bolt 102 in the direction of Arrow "R" in FIG. 17.

The retraction of locking bolt 102 in the direction of Arrow "R" causes the locking bolt projections 104 to move out of locking apertures 46 in the striker side panel 38. This enables door 14 to be opened. Of course when it is desired to resecure the door, the door may be again moved to the closed position. In this position the locking bolt 102 may again be extended such that projections 104 engage in the apertures 46 in the striker side panel, and the lock 126 may be changed such that lock bolt 128 extends into the cut out 146 in the driving cam. This will again place the locking bolt mechanism 24 in the secure position.

It will be appreciated by those skilled in the art that the locking bolt mechanism because it provides multiple places for engagement with the side panel, achieves more secure locking of the door in the closed position. In addition, the mounting of the locking bolt, as well as the nature of the forces applied to move the bolt, enables the bolt to be moved easily and without binding or cocking when lock 126 has been opened. This enables the locking bolt mechanism to be rapidly changed from the secure condition to the open condition by authorized personnel.

A further advantage of the locking bolt mechanism of the preferred embodiment is that if one or more, or even all, the links are disconnected with the bolt is in the extended position, the bolt cannot be moved to the retracted position.

This is because the bolt engages the idler cams and/or the drive cam and is prevented from moving toward the retracted position until the drive cam and idler cams are properly rotated. This reduces vulnerability to attack.

A further advantage of the preferred embodiment of the present invention is that door 14 includes the dead bolt portion 26 which helps to maintain the door in a secure position when closed. As shown in FIGS. 14 and 15, door 14 of the secure enclosure includes a plurality of spaced dead bolt projections 150. Dead bolt projections 150 extend on the hinge side of the door.

As shown in FIG. 24 dead bolt projections 150 are positioned and sized to be accepted in the dead bolt apertures 62 in the hinge side panel 36 when the door is in the closed position. As will be appreciated from FIG. 24, the acceptance of the dead bolt projections 150 into the apertures 62 provides enhanced security. This is because the dead bolt enables holding the door in the closed position even if the hinge is destroyed by an attacker. As a result, the hinge assemblies in general may be completely removed with the door 14 in the closed position, and this still will not enable opening of the door.

In a preferred embodiment the dead bolt apertures and the locking bolt apertures are covered by trim pieces that extend on the outside of the chest portion. This further reduces the vulnerability of the secure enclosure to attack.

A novel aspect of the construction of the secure enclosure of the preferred embodiment is achieved through use of a novel hinge construction which facilitates assembly and adjustment of the door 14 relative to the chest portion 12. The novel hinge construction is shown in the exploded view of upper hinge assembly 20 shown in FIG. 18. It should be appreciated that the upper hinge assembly 20 is preferably identical to lower hinge assembly 22. For this reason only one hinge assembly will be described in detail.

Figure 20:
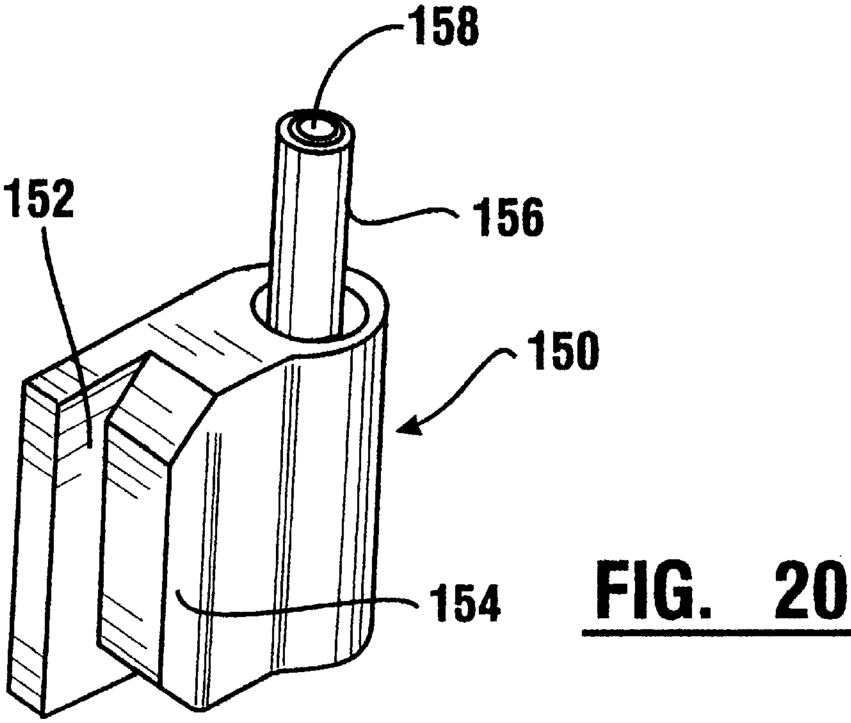
FIG. 20 is an isometric view of the chest hinge portion.
Figure 19:
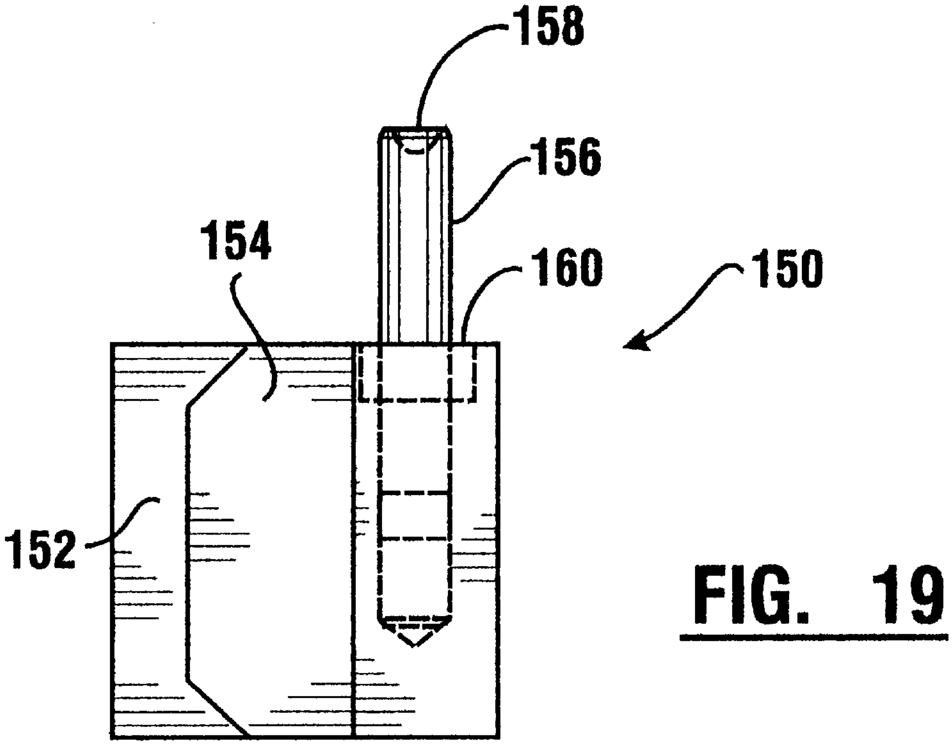
FIG. 19 is a plan view of a chest hinge portion of the hinge assembly.
Figure 22:
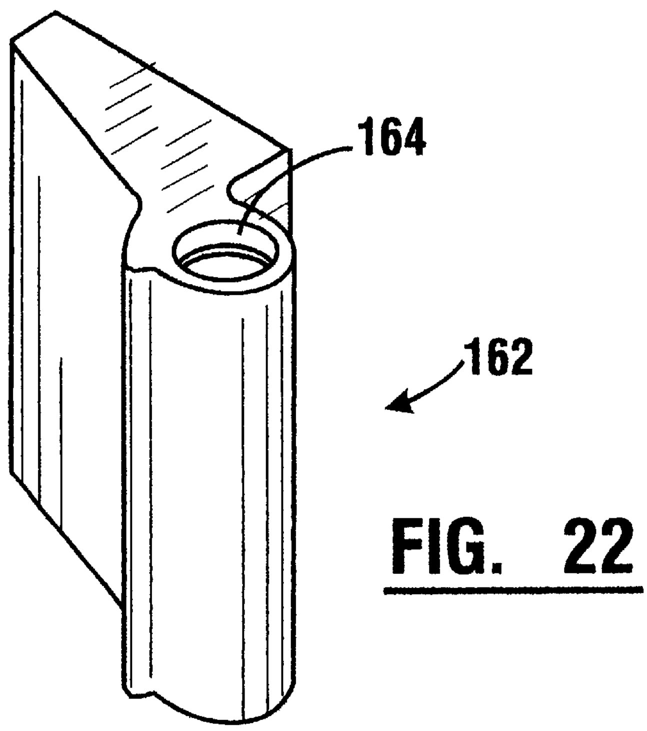
FIG. 22 is an isometric view of the door hinge portion.
Figure 21:
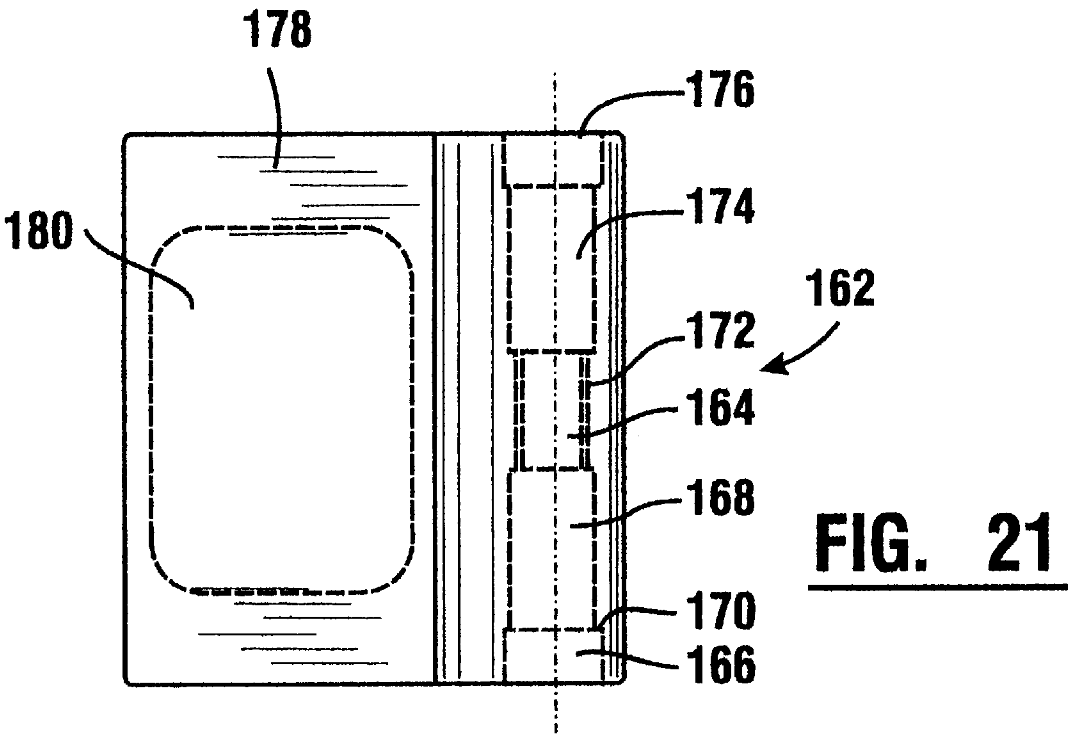
FIG. 21 is a plan view of a door hinge portion of the hinge assembly.

Hinge assembly 20 includes a chest hinge portion 150. Chest hinge portion 150 is shown in greater detail in FIGS. 19 and 20. The chest hinge portion includes an alignment plate portion 152 and a projection 154. Projection 154 is sized for acceptance in the upper and lower cut outs 58 and 60 in the hinge side panel. Projection 154 is configured to be readily accurately positioned in the cut outs prior to welding of the chest hinge portion to the panel. The hinge is preferably welded in place in the cut outs at the interior surface of the panel. This avoids having welds that are exposed on the exterior of the enclosure.

Chest hinge portion 150 further includes a hinge pin 156 that extends therefrom. Hinge pin 156 is preferably securely press fit into an opening in the body of chest hinge portion 150. Hinge pin 156 includes a hemispherical recess 158 at its upper end. Chest hinge portion 150 further includes an annular recess 160. Annular recess 160 extends in surrounding relation of pin 156 a distance into the body of chest hinge portion 150.

The hinge assembly 20 further incudes a door hinge portion 162. Door hinge portion 162 includes a bore 164 that extends therethrough. Bore 164 includes an annular recess 166 that is similarly sized to annular recess 160 in chest hinge portion 150. Bore 164 further includes a pin receiving portion 168. Pin receiving portion 168 is separated from annular recess 166 by an annular radially extending step 170. Bore 164 further includes a central threaded portion 172.

Bore 164 further includes an upper access portion 174. The top of bore 164 includes an enlarged cover recess portion 176. Door hinge portion 162 further includes a door engaging portion 178. Door engaging portion 178 includes a raised projection 180. Raised projection 180 is sized for acceptance in hinge mount openings 182 in door 14 which are shown in FIG. 1. Hinge mount openings 182 accept raised projections 180 and facilitate welding of the door hinge portion 162 to the door 14. The door hinge portions are preferably mounted in the openings and welded therein at the interior surface of the door.

Figure 18:
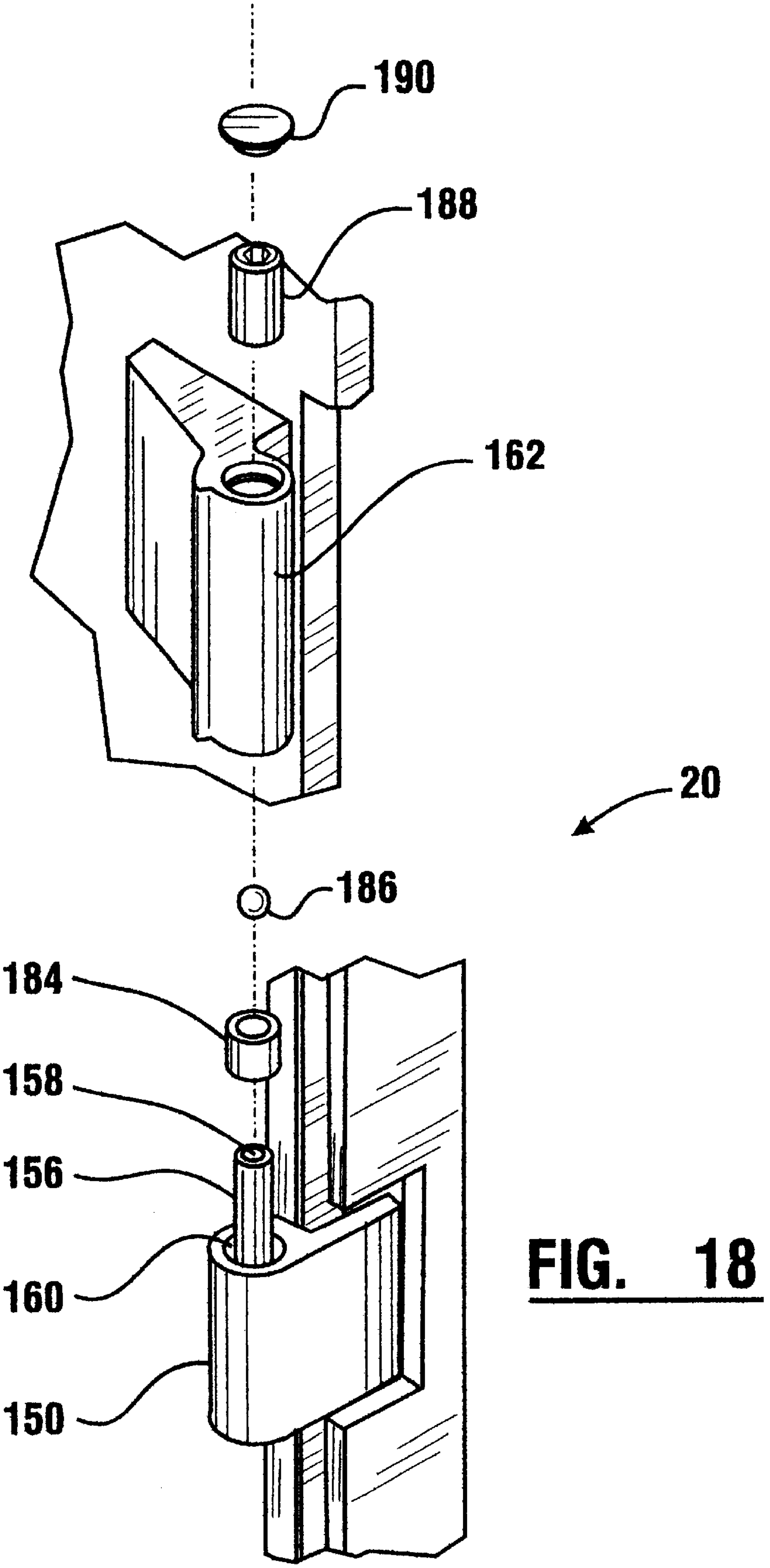
FIG. 18 is an exploded view of a hinge assembly of the preferred embodiment of the present invention.

As shown in FIG. 18 the hinge assembly includes a bushing 184. Bushing 184 is sized for acceptance in both the annular recess 160 of the chest hinge portion as well as the annular recess 166 of the door hinge portion. The bushing is sized to be readily insertable over pin 156 and in the recesses. The door hinge assembly further includes a bearing ball 186. Ball 186 is sized for acceptance in the recess 158 of the hinge pin 156. A hemispherical surface of ball 186 extends outside the recess when the ball is positioned therein.

The hinge assembly further includes a threaded adjusting screw 188. Threaded adjusting screw 188 is configured for threaded movable engagement with the threaded portion 172 of the bore 164 of the door hinge portion 162. As a result the adjusting screw is movable axially in the bore. Adjusting screw 188 includes a hemispherical concave pocket or recess for engaging a portion of ball 186 which extends outward from recess 158. The hinge assembly further includes a cap 190. Cap 190 serves to close bore 164 and is accepted in releasable engagement in the cover recess portion 176 of door hinge portion 162.

The operation and installation of the hinge assembly 20 is now discussed with reference to FIG. 23. In the assembled condition of the hinge assembly, bushing 184 extends in the annular recesses 160 and 166 of the hinge portions in surrounding relation of hinge pin 156. The hinge pin 156 extends upward in the pin receiving portion 168 of the door hinge portion 162. The hinge receiving portion 168 is substantially larger in diameter than the hinge pin 156. This enables the hinge pin 156 to be accepted into the pin accepting portion 168 even though the hinge pin is not perfectly co-axial with the bore 164 of the door hinge portion 162. This construction enables the door hinge portion to be mounted on the chest hinge portion even though the pins 156 of each of the chest hinge portions may be slightly misaligned. In addition, such mounting is achieved even though the two door hinge portions 162, which are first mounted to the door 14, may also have some misalignment relative to the chest hinge portions, as well as to each other.

Figure 23:
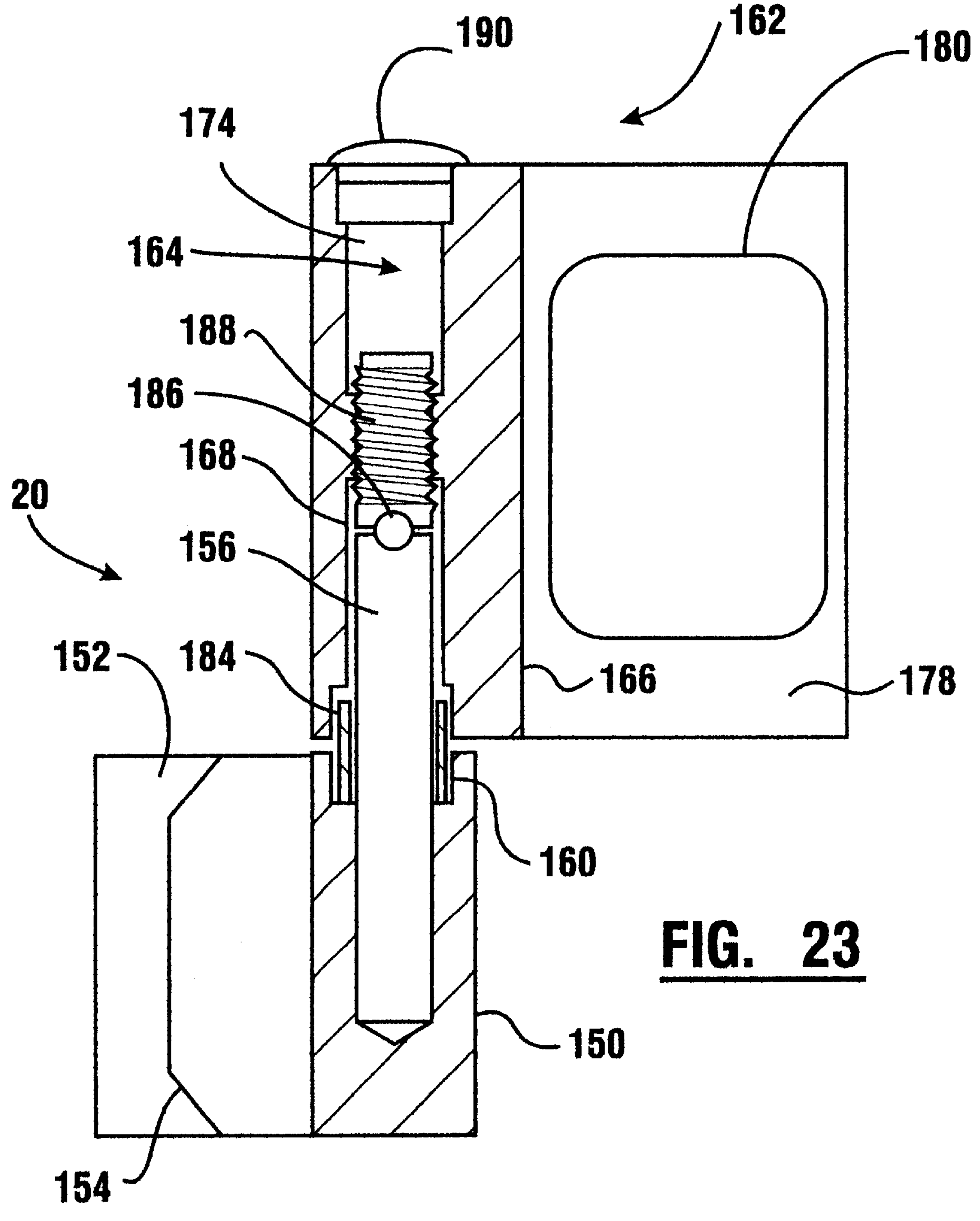
FIG. 23 is a cross sectional view of the hinge assembly of the preferred embodiment in an assembled condition.

As shown in FIG. 23, the bearing ball 186 is securely held in the recess 158 of the hinge pin 156. The bearing ball 186 is further engaged with the concave surface of the adjusting screw 188. As can be appreciated, because the adjusting screw 188 is threaded in the threaded portion 172 of the hinge portion 162, the adjusting screw may be moved to adjust the relative vertical positions of the hinge components. This is accomplished by inserting a tool through the upper access portion 174 of the bore 164 to engage the socket opening in the adjusting screw 188. This enables the door 14 to be selectively positioned relative to the opening 18 of the enclosure.

Cap 190 is accepted into the cover recess portion 176 of the bore in releasable relation. Cap 190 is installed for cosmetic purposes after the adjusting screw 188 has been appropriately adjusted. If desired for security or appearance purposes, cap 190 may be secured in recess portion 176 after adjustment of the hinge.

It will be appreciated that the hinge assembly of the preferred embodiment provides a significant advantage. The hinge portions are attached to the hinge side panel of the enclosure in the assembly process may be somewhat misaligned relative to one another due to minor inaccuracies in the process or variations in materials. The cooperating hinge portions are attached to the door in the assembly process in a separate operation. Welded attachment of the door hinge portions 162 to the door 14 may also result in some misalignment. Despite the bores and pins of the respective hinge portions not being co-axial, the construction still enables mounting of the door onto the secure enclosure due to the spaced relation provided between the hinge pin 156 and the pin receiving portion 168 of the bore 164. The hinges may still be assembled and the door movably mounted on the enclosure despite minor misalignment of the components.

The load bearing engagement of the bearing ball 186 and the concave face of the adjusting screw provides a hinge assembly that does not bind despite minor misalignment. With the door mounted on the hinges the adjusting screws 188 in the hinge assemblies may be appropriately positioned so as to move the door relative to the chest. This enables the door to be fit precisely within the opening 18 when the door is closed. It further enables the alignment of the locking bolt accepting apertures and the dead bolt accepting apertures with the projections on the locking bolt and the door, respectively. Because the load of the door is carried by the pins and adjusting screw, the bushings that surround the pins are independently movable relative to the adjacent pin and door. The bushings protect the pins and minimize frictional resistance to door movement.

A further fundamental advantage of the construction of the preferred embodiment of present invention is that the door is actually enabled to be removable in the open condition. There is no requirement to have the door permanently secured to the enclosure by the hinges. This is because when the door is in the closed position the action of the dead bolt projections and the dead bolt accepting apertures hold the hinge side of the door secured as previously discussed. This further facilitates the assembly process because it enables the chest hinge portions to be attached to the chest and the door hinge portions to be attached to the door in separate operations. During certain servicing procedures it may also be desirable to remove the door for purposes of accessing items in the interior area of the secure enclosure.

The hinge design and assembly method of the intention are also particularly useful when more than two hinges are used to attach the door to the enclosure. The hinge portions may be slightly misaligned axially or vertically and the door may still be readily attached and positioned.

Thus the new secure enclosure for automated banking machine and method of the present invention achieves the above stated objectives, eliminates difficulties encountered in the use of prior devices and methods, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods, processes and relationships are set forth in the appended claims.

We claim:

1. A method of manufacturing automated banking machine enclosures, comprising the steps of:

fabricating a plurality of enclosure panels used for forming enclosures for a plurality of different banking machine types, wherein each banking machine type has at least one opening through its respective enclosure at a location unique to the banking machine type, the plurality of enclosure panels including a plurality of sets of enclosure panels, each set of enclosure panels being attachable together to form an enclosure for a corresponding banking machine type, at least one of the enclosure panels in each of the sets being fabricated with at least one projection or recess, the at least one projection or recess on a panel in a set being engageable in cooperating relation to form an enclosure only by engagement with a mating projection or recess fabricated only on one adjacent panel of the same set;

placing a panel and an adjacent panel from the same set together in interengaging relation to form the enclosure for one particular machine type by engaging the cooperating projection and recess;

securing the panel and adjacent panel together in fixed relation.

2. The method according to claim 1 wherein each panel is bounded by side edges, and wherein in the fabricating step the interengaging projection and recess are formed on the side edges.

3. The method according to claim 2 wherein each panel is a generally rectangular panel, and wherein each panel is bounded by at least four side edges, and wherein in the fabricating step the interengaging projections and recesses are formed on at least two of the side edges of each panel.

4. The method according to claim 1 wherein in the fabricating step the interengaging projections and recesses vary in size or location between panels for enclosures of different machine types.

5. The method according to claim 1 wherein the enclosure of the banking machine is comprised of five generally rectangular panels, each panel having four side edges, and wherein in the fabricating step four of the panels are formed with interengaging projections or recesses in three side edges and one panel is formed with interengaging projections or recesses on four side edges.

6. The method according to claim 1 wherein the placing step comprises the steps of placing the panel in a fixture in abutting relation with a first support, and holding the panel in abutting relation with the first support with a magnet in supporting connection with the first support.

7. The method according to claim 6 wherein the placing step further comprises the steps of placing the adjacent panel in abutting relation with a second support and holding the adjacent panel in abutting relation with the second support with a magnet in supporting connection with the second support.

8. The method according to claim 1 wherein the enclosure of the particular machine type comprises a front panel, a hinge side panel, a top panel, and a bottom panel, and wherein each panel is a generally rectangular panel bounded by four side surfaces, and wherein in the fabricating step the front panel is formed with the projections or recesses in the four side surfaces, and the other panels are formed with the projections or recesses in at least one side surface, and wherein the placing step includes the steps of interengaging the projections or recesses on each side surface of the front panel in interengaging relation with the projections or recesses on the one side surface of each other panel.

9. The method according to claim 8 wherein in the fabricating step each of the panels other than the front panel is formed with projections or recesses in at least three of the side surfaces thereof, and wherein the placing step further comprises further interengaging the projections or recesses on each of the two side surfaces of the other panels, which surfaces are not engaged with the front panel, with projections or recesses on one side surface of an adjacent other panel.

10. The method according to claim 9 wherein in the placing step a five sided enclosure having an opening to an interior area is formed by engagement of said panels, and wherein the securing step comprises extending a frame on the enclosure wherein the frame extends in the opening, and fastening the panels comprising the enclosure together.

11. The method according to claim 10 wherein the securing step further comprises removing the frame after the panels are fastened together.

12. The method according to claim 10 wherein the panels are fastened together by welding the panels together at panel surfaces in the interior area of the enclosure.

13. The method according to claim 1 wherein prior to the placing step further comprising the step of adjusting a fixture to enable placing the panel and adjacent panel therein.

14. The method according to claim 13 wherein the adjusting step includes moving a first support a selected first distance from a second support, and moving a third support a selected second distance from a fourth support.

15. The method according to claim 14 wherein the first support extends generally perpendicular to the third support.

16. The method according to claim 15 wherein the panel is a top or bottom panel of the particular enclosure, and the adjacent panel is a striker side panel or a hinge side panel of the enclosure, and wherein in the placing step the top or bottom side panel is placed in supporting connection with one of the first or third supports, and the striker or hinge side panel is placed in supporting connection with the other of the first or third supports.

17. A method of manufacturing automated banking machine enclosures, comprising:

fabricating a plurality of enclosure panels used for forming enclosures for a plurality of different banking machine types, wherein each banking machine type has at least one opening through its respective enclosure at a location unique to the banking machine type, the plurality of enclosure panels including a particular set of enclosure panels, the particular set of enclosure panels being attachable together to form an enclosure for a particular banking machine type, at least one of the enclosure panels of the set being fabricated with at least one projection or recess, the at least one projection or recess on the at least one of the enclosure panels being engageable in cooperating relation only with a mating projection or recess fabricated only on one adjacent panel of the set, and wherein the interengaging projections and recesses for enclosures of different machine types vary in size or location between adjacent panels;

placing a panel and an adjacent panel from the set together in interengaging relation to form the enclosure for the particular machine type by engaging the cooperating projection and recess;

securing the panel and adjacent panel together in fixed relation.

18. The method according to claim 17 wherein each panel in the particular set of panels has a unique projection or recess arrangement.

19. The method according to claim 18 wherein each panel is bounded by side edges, and wherein each panel in the particular set of panels has a plurality of projections or recesses formed on at least two of the side edges.

* * * * *